United States Patent
Tack et al.

(10) Patent No.: US 11,733,095 B2
(45) Date of Patent: Aug. 22, 2023

(54) HYPERSPECTRAL IMAGE SENSOR WITH CALIBRATION

(71) Applicant: IMEC, Leuven (BE)

(72) Inventors: Nicolaas Tack, Buggenhout (BE); Andy Lambrechts, Herent (BE); Luc Haspeslagh, Lubbeek-Linden (BE)

(73) Assignee: IMEC, Leuven (BE)

(*) Notice: Subject to any disclaimer, the term of this patent is extended or adjusted under 35 U.S.C. 154(b) by 77 days.

(21) Appl. No.: 17/302,217

(22) Filed: Apr. 27, 2021

(65) Prior Publication Data

US 2021/0247232 A1    Aug. 12, 2021

Related U.S. Application Data

(60) Continuation of application No. 16/814,234, filed on Mar. 10, 2020, now Pat. No. 11,029,207, which is a
(Continued)

(51) Int. Cl.
*G01J 3/28* (2006.01)
*H04N 23/11* (2023.01)
(Continued)

(52) U.S. Cl.
CPC .............. *G01J 3/2823* (2013.01); *G01J 3/12* (2013.01); *G01J 3/26* (2013.01); *G01J 3/2803* (2013.01);
(Continued)

(58) Field of Classification Search
CPC .................................................. G01J 3/2823
(Continued)

(56) References Cited

U.S. PATENT DOCUMENTS

| 4,822,998 A | 4/1989 | Yokota et al. |
| 4,957,371 A | 9/1990 | Pellicori et al. |

(Continued)

FOREIGN PATENT DOCUMENTS

| EP | 1967890 A2 | 9/2008 |
| JP | 06129908 A | 5/1994 |

(Continued)

OTHER PUBLICATIONS

European Patent Office; Communication pursuant to Article 94(3) EPC; Application No. 12175340.4; dated Dec. 19, 2022; 6 pgs.
(Continued)

*Primary Examiner* — Yulin Sun
(74) *Attorney, Agent, or Firm* — Garlick & Markison; Kelly H. Hale

(57) ABSTRACT

A method for calibrating an image sensor begins by illuminating a portion of the image sensor with an input light spectrum, where the input light spectrum includes light of known wavelength and intensity. The method continues by sampling an output for each optical sensor of the image sensor, where each optical sensor is associated with one or more optical filters and where each optical filter being associated with a group of optical filters of a plurality of groups of optical filters. Each optical filter of a group of optical filters is configured to pass light in a different wavelength range and at least some optical filters in different groups of the plurality of groups of optical filters are configured to pass light in substantially a same wavelength range. The method then continues by comparing a sampled output for each optical sensor of the plurality of optical sensors with an expected output and generating a calibration factor for each of at least a subset of the plurality of optical sensors and storing the generated calibration factors in memory.

20 Claims, 38 Drawing Sheets

Related U.S. Application Data continuation of application No. 16/359,911, filed on Mar. 20, 2019, now Pat. No. 10,620,049, which is a continuation of application No. 15/059,715, filed on Mar. 3, 2016, now Pat. No. 10,260,945, which is a division of application No. 13/482,860, filed on May 29, 2012, now Pat. No. 9,304,039, which is a continuation of application No. PCT/EP2010/068575, filed on Nov. 30, 2010.

(60) Provisional application No. 61/265,231, filed on Nov. 30, 2009.

(51) Int. Cl.
*H04N 25/75* (2023.01)
*G01J 3/26* (2006.01)
*G01J 3/12* (2006.01)

(52) U.S. Cl.
CPC .............. *H04N 23/11* (2023.01); *H04N 25/75* (2023.01); *G01J 2003/1226* (2013.01); *G01J 2003/265* (2013.01); *G01J 2003/2806* (2013.01); *G01J 2003/2826* (2013.01)

(58) Field of Classification Search
USPC ........................................................ 348/164
See application file for complete search history.

(56) References Cited

U.S. PATENT DOCUMENTS

| | | | |
|---|---|---|---|
| 5,144,498 A | 9/1992 | Vincent | |
| 5,159,199 A | 10/1992 | LaBaw | |
| 5,379,065 A | 1/1995 | Cutts | |
| 6,256,406 B1 * | 7/2001 | Garland | A61B 6/583 |
| | | | 382/132 |
| 2006/0039009 A1 | 2/2006 | Kiesel | |
| 2007/0148760 A1 | 6/2007 | Klesel | |
| 2008/0042782 A1 | 2/2008 | Wang et al. | |
| 2008/0170228 A1 * | 7/2008 | Jiang | H04N 17/002 |
| | | | 356/416 |
| 2009/0001286 A1 | 1/2009 | Kearfott | |
| 2009/0087764 A1 | 4/2009 | Weiss | |
| 2011/0222060 A1 | 9/2011 | Smith | |
| 2014/0151575 A1 | 6/2014 | Hillmer | |

FOREIGN PATENT DOCUMENTS

| | | |
|---|---|---|
| WO | 200006979 A1 | 2/2000 |
| WO | 200214811 A1 | 2/2002 |
| WO | 2004106874 A1 | 12/2004 |
| WO | 2006094147 A1 | 9/2006 |
| WO | 2008017490 A2 | 2/2008 |
| WO | 2008104928 A1 | 9/2008 |

OTHER PUBLICATIONS

European Patent Office; Extended EP Search Report; Application No. 22200035.8; dated Jan. 3, 2023; 13 pgs.
Higino Correia et al.; High-Selectivity Single-Chip Spectrometer in Silicon for Operation at Visible Part of the Spectrum; IEEE Transactions on Electron Devices; vol. 47, No. 3; Mar. 2000; pp. 553-559.
http://en.wikipedia.org/wiki/Hyperspectral_imaging. Retrieved on Feb. 19, 2013.
Hunkel et al.; Integrated photometer with porous silicon interference filters; Materials Science and Engineering B69-70; 2000; pp. 100-103.
International Search Report for International Application No. PCT/EP2010/068575; dated May 11, 2011 by European Patent Office.
Reinstra et al.; Multispectral Focal Plane Assembly for Satellite Remote Sensing; Aerospace Conference; 1998 IEEE Snowmass at Aspen, CO, USA; Mar. 21-28, 1998; New York, NY, USA; IEEE; US; vol. 5; Mar. 21, 1998; pp. 233-241.
Wang et al.; 128 Channels of Integrated Filter Array in the NIR Region Fabricated by Using the Combinatorial Deposition Technique; Novel Devices and Components (Nano and Quantum devices, Photonic crystals); 2006.
Wang et al.; 16×1 integrated filter array in the MIR region prepared by using a combinatorial etching technique; Applied Physics B 82, 2006; pp. 637-641.
Wang et al.; Concept of a high-resolution miniature spectrometer using an integrated filter array; Optics Letters; vol. 32, No. 6; Mar. 15, 2007; pp. 632-634.

* cited by examiner

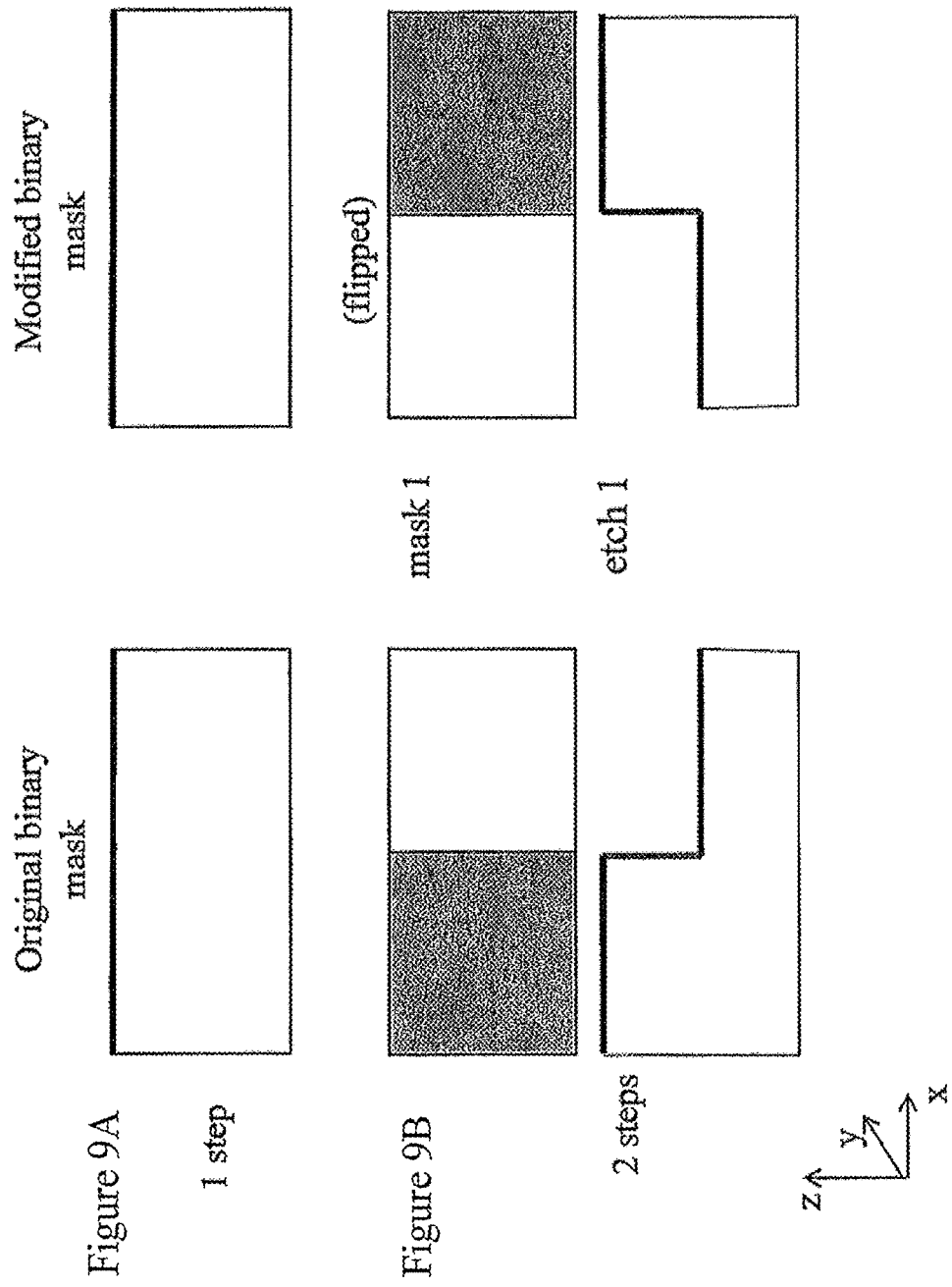

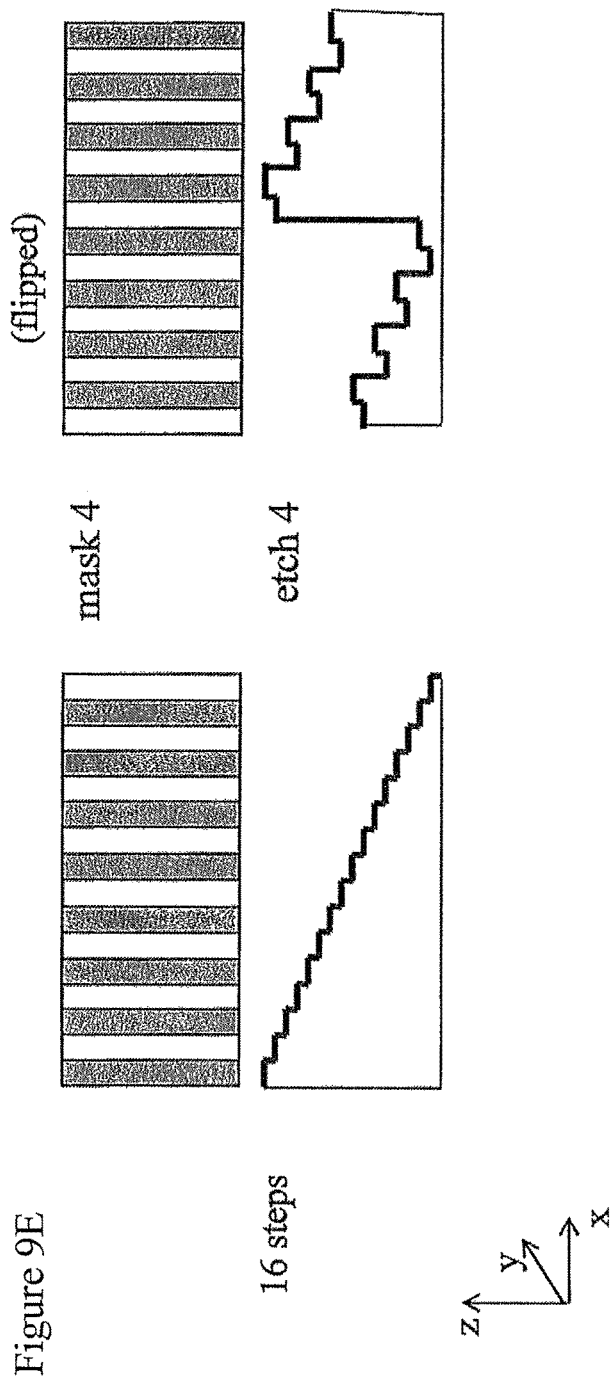

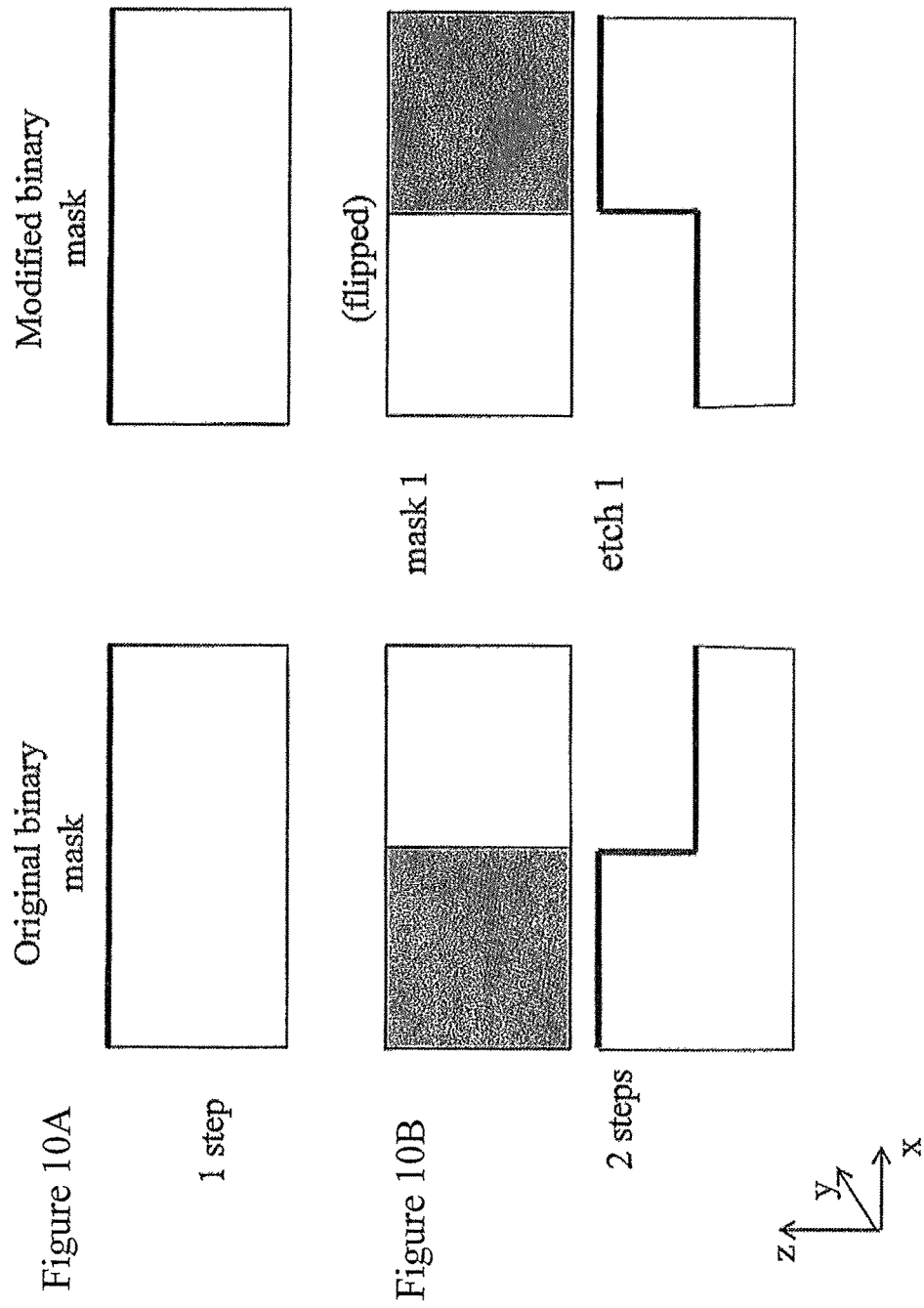

HYPERSPECTRAL IMAGE SENSOR WITH CALIBRATION

CROSS REFERENCE TO RELATED APPLICATIONS

The present U.S. Utility Patent Application claims priority pursuant to 35 U.S.C. § 120 as a continuation of U.S. Utility application Ser. No. 16/814,234, entitled "INTEGRATED CIRCUIT FOR SPECTRAL IMAGING SYSTEM", filed Mar. 10, 2020, which is a continuation of U.S. Utility application Ser. No. 16/359,911, entitled "INTEGRATED CIRCUIT FOR SPECTRAL IMAGING SYSTEM", filed Mar. 20, 2019, issued as U.S. Pat. No. 10,620,049 on Apr. 14, 2020, which is a continuation of U.S. Utility application Ser. No. 15/059,715, entitled "INTEGRATED CIRCUIT FOR SPECTRAL IMAGING SYSTEM", filed Mar. 3, 2016, issued as U.S. Pat. No. 10,260,945 on Apr. 16, 2019, which is a divisional of U.S. Utility application Ser. No. 13/482,860, entitled "INTEGRATED CIRCUIT FOR SPECTRAL IMAGING SYSTEM", filed May 29, 2012, issued as U.S. Pat. No. 9,304,039 on Apr. 5, 2016, which is a continuation of PCT Application No. PCT/EP2010/068575, entitled "INTEGRATED CIRCUIT FOR SPECTRAL IMAGING SYSTEM", filed Nov. 30, 2010, which claims priority pursuant to 35 U.S.C. § 119(e) to U.S. Provisional Application No. 61/265,231, entitled "HYPERSPECTRAL CAMERA SYSTEM", filed Nov. 30, 2009, all of which are hereby incorporated herein by reference in their entirety and made part of the present U.S. Utility Patent Application for all purposes.

BACKGROUND OF THE INVENTION

Field of the Invention

The disclosed technology relates to integrated circuits for an imaging system which has an array of optical sensors and an array of optical filters, and to corresponding systems and methods, and computer programs, and more particularly to hyperspectral imaging (HSI) systems.

Description of the Related Technology

Operation of Known Hyperspectral Imaging Systems

Hyperspectral imaging refers to the imaging technique of collecting and processing information from across the electromagnetic spectrum. Whereas the human eye only can see visible light, a hyperspectral imaging system can see visible light as well as from the ultraviolet to infrared. Hyperspectral sensors thus look at objects using a larger portion of the electromagnetic spectrum, as has been described at: http://en.wikipedia.org/wiki/Hyperspectral_imaging.

Certain objects leave unique 'fingerprints' across this portion of the electromagnetic spectrum. These 'fingerprints' are known as spectral signatures and enable identification of the materials that make up a scanned object. The hyperspectral capabilities of such imaging system enable to recognize different types of objects, all of which may appear as the same color to the human eye.

Whereas multispectral imaging deals with several images at discrete and somewhat narrow bands, hyperspectral imaging deals with imaging narrow spectral bands over a contiguous spectral range. It can produce the spectra for all pixels in the scene. While a sensor with 20 discrete bands covering the VIS, NIR, SWIR, MWIR, and LWIR would be considered multispectral, another sensor with also 20 bands would be considered hyperspectral when it covers the range from 500 to 700 nm with 20 10-nm wide bands.

Hyperspectral sensors collect information as a set of 'images'. Each image represents a range of the electromagnetic spectrum and is also known as a spectral band. These images each have two spatial dimensions and if images of a series of different spectral bands are effectively stacked to form a cube, then the third dimension can be a spectral dimension. Such a three dimensional hyperspectral cube is a useful representation for further image processing and analysis. The precision of these sensors is typically measured in spectral resolution, which is the width of each band of the spectrum that is captured. If the scanner picks up on a large number of fairly narrow frequency bands, it is possible to identify objects even if the objects are only captured in a handful of pixels. However, spatial resolution is a factor in addition to spectral resolution. If the pixels are too large, then multiple objects are captured in the same pixel and become difficult to identify. If the pixels are too small, then the energy captured by each sensor-cell is low, and the decreased signal-to-noise ratio reduces the reliability of measured features.

Current hyperspectral cameras produce a hyperspectral datacube or image cube, consisting of a stack of 2D images in the x-y plane of the scene in which each image of the stack contains information from a different frequency or spectral band. The spectral range that is captured is not limited to visual light, but can also span infra red (IR) and/or ultra violet (UV). The 3D Image Cube is captured by a hyperspectral imager, using a sensor that is inherently a 2D sensor. Therefore some form of scanning needs to be used, as is shown in FIG. 1 which shows a perspective representation of a cube with the spectral dimension extending vertically, and four views a) to d) of slices of the cube as follows:

Topview (a) shows the scene that needs to be captured. Left sideview (b) shows a vertical slice from the cube, representing an image obtained by a line scanner: all spectral bands are captured for one spatial line of the scene resulting in a 1D view. Line scanners or pushbroom systems thus capture a single line of the 2D scene in all spectral bands in parallel. To cover all spatial pixels of the scene, this type of system then scans different lines over time, for example by relative movement of the scanner and the scene.

Right sideview (c) shows a horizontal slice showing an image obtained by a starer: the complete 2D scene is captured in one spectral band. Starers or staring systems capture the complete scene in a single spectral band at a time with a 2D array of sensors and scan over different spectral bands in order to produce the 3D hyperspectral image cube. Bottom view (d) shows a sloping or diagonal slice through the cube, representing an image obtained by a hybrid line scanner/starer: the complete 2D scene is captured, but every spatial line is at a different height of the cube and so is a different spectral band. In this case a complete spatial image is acquired, but with every line at a different spectral band. In a single frame different spectral bands are then captured for different spatial lines. To capture the complete 3D image cube, with all spectral bands for all spatial lines, a combined spatial/spectral scanning is still needed, for example by relative motion between the scene and the 2D sensor array.

Construction of Known Hyperspectral Imaging Systems

Hyperspectral imaging systems or cameras can consist of different discrete components, e.g. the optical sub-system for receiving the incoming electromagnetic spectrum, the spectral unit for creating the different bands within the received spectrum and the image sensor array for detecting the different bands. The optical sub-system can consist of a single or a combination of different lenses, apertures and/or slits. The spectral unit can consist of one or more prisms, gratings, optical filters, acousto-optical tunable filters, liquid crystal tunable filters etc or a combination of these.

A primary advantage of hyperspectral imaging is that, because an entire spectrum is acquired at each point, the operator needs no prior knowledge of the sample, and post-processing allows all available information from the dataset to be mined. The primary disadvantages are cost and complexity. Fast computers, sensitive detectors, and large data storage capacities are needed for analyzing hyperspectral data. Significant data storage capacity is necessary since hyperspectral cubes are large multi-dimensional datasets, potentially exceeding hundreds of megabytes. All of these factors greatly increase the cost of acquiring and processing hyperspectral data.

State-of-the-art hyperspectral imagers are therefore either research instruments as they are too slow and too expensive or either designed for a dedicated industrial application thereby lacking flexibility.

SUMMARY OF CERTAIN INVENTIVE ASPECTS

A first aspect provides an integrated circuit for an imaging system. An effect of these features is that read out from the array of optical sensors can be speeded up or that a larger array can be used for a given speed of read out. This faster readout can reduce blur caused by relative movement of the array of sensors and the subject being imaged, or can increase a resolution or quality of the image. The groups of sensors can be arranged in various ways, such as interleaved, or linearly concatenated for example. Image artifacts arising from the pattern of the groups can be compensated by subsequent image processing if necessary.

A second aspect provides an integrated circuit for an imaging system. An effect of having the thickness of the optical filter vary so as to increase at some points and decrease at other points along the line is that it enables neighboring optical filters to be either both thicker or both thinner, to create ridges or valleys, or to enable clusters of optical filters to cover overlapping spectral bands for example.

A third aspect provides an integrated circuit for an imaging system. An effect of such variation of thickness along the strip is to improve spectral precision in the sensing or improve yield, or reduce a need for image processing, or enable larger arrays for a given yield or precision.

A fourth aspect provides an integrated circuit for an imaging system. An effect of the read out circuitry having a wavelength selector for selecting between or interpolating between read out signals of corresponding pixels of different optical filters is that it enables for example spectral subsampling or spectral shifting, to compensate for various possible distortions. This in turn can enable yield increases for a wafer and/or cost decrease, since more variation in thickness can be tolerated for a given accuracy in wavelength passed and therefore detected. Another aspect provides an imaging system having such an integrated circuit. Other aspects provide corresponding methods of imaging using such systems, and corresponding computer programs for image processing of a spectral cube.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION OF CERTAIN ILLUSTRATIVE EMBODIMENTS

Figure 1:
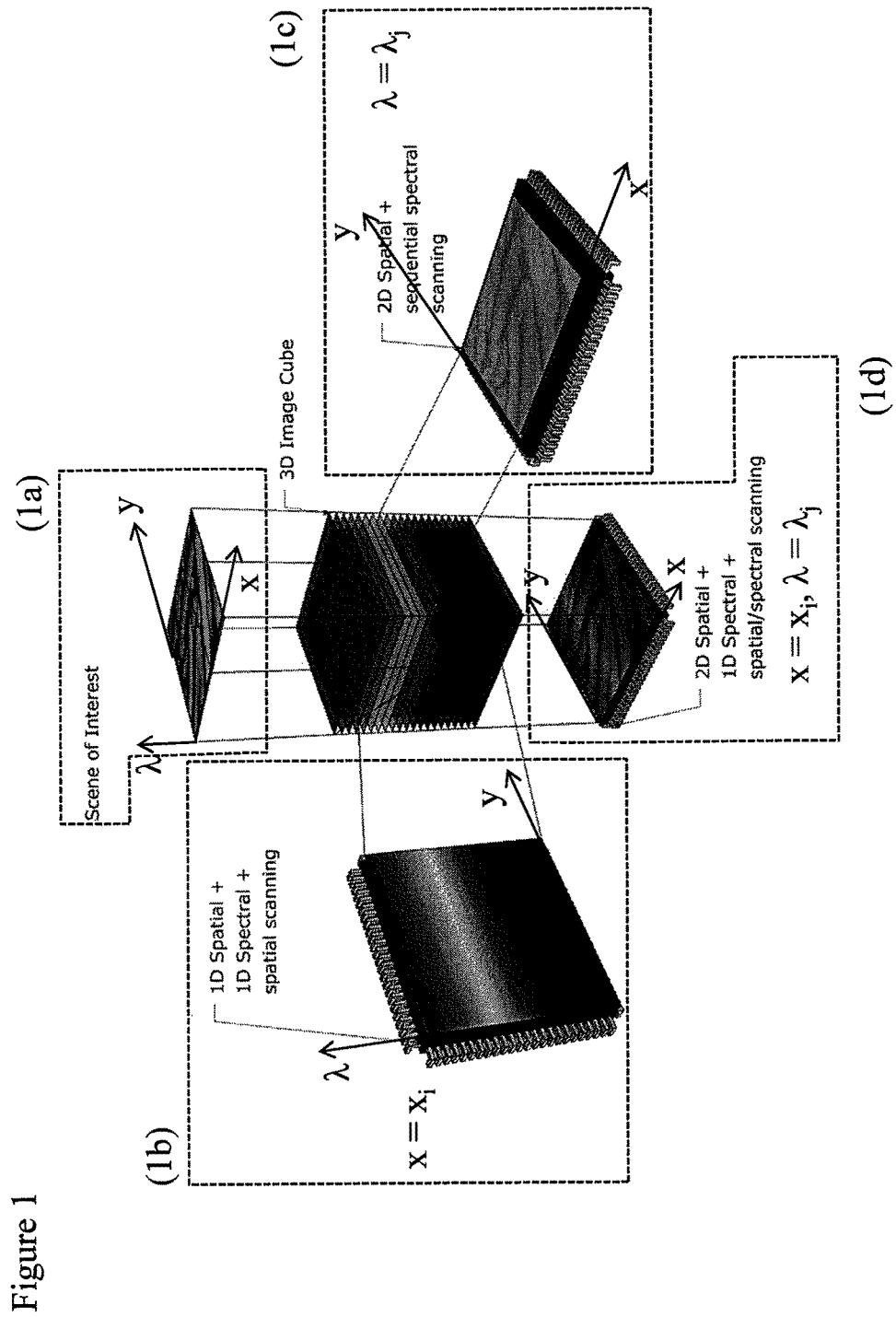
FIG. 1 shows the Hyperspectral Image Cube Acquisition.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to optical are intended to encompass at least wavelengths within the human visible wavelength range and also infra red wavelengths, and shorter wavelengths, extending into the ultra violet bands, where the sensitivity to manufacturing variations in thickness of the optical filter are even more pronounced. In some embodiments, the optical filters and optical sensors can be limited to a range which is any subset of these wavelengths, for example visible wavelengths only, or visible and shorter wavelengths.

References to arrays of optical filters or arrays of optical sensors are intended to encompass 1-dimensional linear arrays, 2-dimensional arrays, rectangular or non rectangular arrays, irregularly spaced arrays, and non planar arrays for example.

References to integrated circuits are intended to encompass at least dies or packaged dies for example having the array of optical filters monolithically integrated onto the array of sensors, or devices in which the array of optical filters is manufactured separately and added later onto the die or into the same integrated circuit package.

References to a spectrum of wavelengths are intended to encompass a continuous spectrum or a range of nearly adjacent discrete bands for example.

References to pixels being read out in parallel are intended to encompass instances in which all pixels have a separate line for read out, and instances where two or more pixels share a line and are output enabled at different times, giving a partially parallel arrangement.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Issues Addressed by the Embodiments:

It is desirable to have a combined spectral unit with image sensor array. This integrated component needs to be combined with an optical sub-system to form a complete hyperspectral camera system. Such a hyperspectral imaging system should be compact, be capable of manufacture at low cost, and be reconfigurable. In certain aspects, process technology aspects are combined with the system integration and image processing techniques to alleviate the integrated circuit manufacturing process requirements.

In some examples, a hyperspectral imaging system is disclosed comprising an integrated circuit with a spectral unit monolithically integrated with the array of optical sensors forming the image sensor array.

In a preferred embodiment the spectral unit is integrated with the image sensor array using semiconductor process technology, i.e. the spectral unit is post processed on the substrate comprising the image sensor array using semiconductor process technology and process steps. Examples of such semiconductor technology are complementary-metal-oxide-semiconductor (CMOS) processing, whereby the image sensor array is a CMOS sensor, and charge-coupled-device (CCD) processing, whereby the image sensor array is a CCD sensor. These manufacturing techniques are ideally suited for producing integrated electronic circuits. Such monolithic integration allows manufacturing at low cost while offering a higher performance as no interface layers are needed to attach the spectral unit to the substrate. Hence stray light effects are considerably reduced.

Given the large range of technology generations, one can choose to manufacture the IMEC sensor in a lower cost technology having a large critical dimension (CD), e.g., 130 nm, resulting a larger pixels and smaller spatial resolution of the image sensor array. Alternatively one choose to manufacture the image sensor array in a state in a higher cost technology having a smaller critical dimension (CD), e.g., 45 nm, resulting a smaller pixels and higher spatial resolution of the image sensor array.

The image sensor array can be a front-illuminated sensor, whereby the spectral unit is post processed on top of the substrate comprising the sensor. Optionally this substrate is thinned afterwards thereby removing the bulk of the substrate and leaving a thin slice containing the image sensor array and the spectral unit monolithically integrated therewith. Alternatively the image sensor array can be a back-illuminated sensor, whereby first the substrate comprising the sensor is thinned from the backside onwards. On backside the thinned substrate the spectral unit is then post processed.

Preferably the spectral unit is a sequential 1D or 2D array of Fabry-Pérot filters. This array can be monotonic whereby the thickness of the Fabry-Pérot filters decreases in a monotonic way from one side of the array to the other. Alternatively this array can be non-monotonic whereby the thickness of the Fabry-Pérot filters varies in a non-monotonic way from one side of the array to the other side. Methods for manufacturing such Fabry-Pérot filters are disclosed.

Although any order of Fabry-Pérot filters can be manufactured, preferably only 1st order Fabry-Pérot filters are formed on the image sensor array thereby reducing the complexity for removing and/or blocking higher order components. Hence the complexity of operating the hyperspectral system is reduced. As the spectral unit is directly post processed on the substrate comprising the sensor, the spectral unit can be made thin and such a 1st order Fabry-Pérot filter can be manufactured. A monolithically integrated hyperspectral imaging with a 1st order Fabry-Pérot filter as spectral unit typically doesn't require a focusing lens in the optical subsystem.

Examples of complete hyperspectral imaging systems comprising the optical subsystem and the monolithically integrated spectral unit and image sensor array are disclosed. These complete imaging systems exploit from the benefits of the monolithically integration to allow freedom in designing the optical subsystem.

Furthermore, methods for designing and operating a hyperspectral imaging system according to embodiments of the first aspect are also disclosed. These design and operating methods exploit the manufacturing features of these monolithically integrated imaging systems thereby tolerating a larger manufacturing window.

In some embodiments spectral oversampling is used to correct for deficiencies and process tolerances in the manufacturing technology. The hyperspectral imaging system is designed to have a higher spectral resolution and a higher number of bands than required by the targeted application(s). The thus designed imaging system has a reduced sensitivity of the Fabry-Perot filters to processing tolerances introduced, in particular by the tight specifications of a first order Fabry-Pérot filter. In addition, such a design enables a configurable reduction in spectral resolution by tuning the optical system at runtime for gaining speed. The need for a collimator and slit is thereby eliminated resulting in a lower cost hyperspectral imaging system.

In some embodiments, range extension is used to correct for deficiencies and process tolerances in the manufacturing technology. The sequential 1D or 2D array of Fabry-Pérot filters is designed in a particular non-monotonous ordering, range extensions and intentional overlap/reproduction of steps. The thus designed imaging system has a reduced sensitivity of the Fabry-Pérot filters to processing tolerances introduced, in particular by the tight specifications of a first order Fabry-Pérot filter. In addition the design of the filters, e.g. the thickness which defines the cavity length of the filters, can take into account the location of the particular filter on the chip to reduce the dependency on variations in the incident angle of the incoming electromagnetic spectrum.

Monolithic Integration:

The filter is post-processed on top of an image sensor array and every step is aligned with a single or multiple rows or columns of the image sensor array. Every step of the wedge filters out a different spectral band. As a result, the sensor and wedge filter combination can be used in hyperspectral imagers of the pushbroom, line scanner type or the hybrid line scanner/starer type. A hyper spectral camera system can comprise an optical filter post-processed on an image sensor array as defined in the above, the system further comprising an objective lens and/or slit and/or a collimator.

The integrated spectral module is an integrated circuit forming a subsystem of this camera, and built from different optical line filters integrated on top of an image sensor. Existing wedge filters are discrete components that are assembled onto the image sensor post production. As a result of the monolithic integration that is part of one aspect of the disclosure, in which the filter is directly post processed on top of the imager, the amount of stray light between the filter and the image sensor can be significantly reduced. As a result the spectral resolution is improved with respect to discretely integrated filters. Preferably semiconductor imagers such as CMOS imagers or CCD imagers are used to monolithically integrate the Fabry-Perot filter.

The proposed hyperspectral module can be monolithically integrated, meaning that the filter structures are directly post-processed on top of the image sensor. This integration has very important advantages and some consequences, compared to filter structures that are separately produced and then assembled with the imager later. Advantages of monolithic integration are cost reduction through standard CMOS production steps, reduction in stray light, allow design for first order and avoid the need for a focusing lens.

When compared to a hybrid integration, in which the filter structures are separately produced and then assembled with the image sensor into the hyperspectral module, the proposed approach has some very clear advantages.

Firstly, the combination of both production sequences into one combined flow leads to an overall simplification and cost reduction in the production, when compared to a hybrid integration of the filter structures that are separately produced and then later assembled with the sensor into the module. This is especially the case for this filter, as the post-production of the filter structures requires only CMOS compatible fabrication steps, like deposition, patterning and etching. By adding these steps to the normal production flow of the image sensor, expensive, error prone and labor intensive assembly steps are prevented. E.g., for a filter with 3 layers of oxide and amorphous silicon in the Bragg stack and 127 steps in the cavity, around 50 lot-turns are needed, giving an additional cost of more or less 20% with respect to standard CMOS imagers. The number of lot turns for the deposition of the top and bottom mirror layers can even be reduced if the different layers can be deposited, one after the other, in the same tool.

Secondly by manufacturing the filter structure directly on top of the pixels of the imager, photons can pass directly from the filter into the pixel below. In the case of front side illuminated sensors, photons will first pass through the metallization layers and some dielectric layers. When the filter structure is produced separately and stacked on top of the image sensor, there will always be a non-functional layer or gap in between both structures.

Even when the filter and substrate combination is flipped and the filter is located in between the supporting substrate and the image sensor, the light will pass through the substrate first, then through the filter and finally through a thin air or glue gap, before it hits the image sensor photodiodes. When a filter structure is combined with an image sensor, be it stacked on top of each-other with air or glue between the different layers, this extra substrate between the filter structure and the underlying rows of pixels will always give rise to a certain amount of performance degradation because of:

Cross Talk

Photons that exit the filter structure above a certain pixel can cross the gap and fall onto a neighboring pixel. This effect will be heavily reduced when the gap is reduced or completely removed by a direct postprocessing of the filter onto the pixels. There can still be some cross-talk as a result of the thickness of the filter itself however, as a photon that enters the filter above one pixel can still propagate through the filter and fall onto a neighboring pixel. This is reduced by designing thinner filters and by controlling the angle of incidence.

Stray Light

The extra non-functional layer gives rise to extra reflections on its boundaries if the refractive indices are not matched (See Equation 8 below) and therefore to extra stray light on top of the cross-talk discussed above. By reducing the effective distance S between the filter and the pixel array of the image sensor for different incident angles stray light is reduced. For a smaller distance S, e.g. 1 nm, the distance that is traveled by the stray light (D) is well within normal pixel dimensions (e.g. 1 to 15 nm). This is not the case for more macroscopic integration distances, e.g. 1 mm substrate, in which case the distance of the traveled light D ranges over tens to hundreds of pixels, leading to a severe deterioration of the spatial and spectral resolution. In some cases, the distance D can become so large, an additional focus lens is required to focus the light back onto the pixel.

Parasitic Fabry-Perot Because on Top of the Stray Light:

Additionally, as indicated in the previous item, the dielectric stack and metals on top of the photodiodes reflect part of the light. Together with the gap because of the heterogeneous integration and the bottom mirror of the cavity, this forms a parasitic Fabry-Perot interfering with the actual one. This process can be optimized with the monolithic integration as the dielectric layers in the imager become part of the bottom Bragg stack, made in similar materials (e.g. oxide) and which is not very sensitive to the width of these layers.

One important reason why the hybrid filter structures that are post-production assembled onto the image sensors suffer heavily from this problem, is the fact that the construction of very thin filter structures separately, requires the additional insertion of a (transparent) support structure to mechanically support the filters and enable the stacking. When this layer is placed between the filter and the image sensor, the non-functional gap consists of this layer and an additional air or glue gap in between the support layer and the image sensor. When the support structure is placed on top, it can also generate additional reflections and should be optimized separately (e.g. by adding anti-reflective coatings), but still there will be an air or glue layer in between the filter and the image sensor. All of this can be made redundant by post-processing the filter structures directly on top of the image sensor, as has been discussed above.

Thirdly, the monolithic integration, combined with very precise CMOS fabrication techniques, enables the construction of filter structures with much smaller thicknesses. As discussed later, the Fabry-Perot filter structure is designed to select a certain wavelength by tuning the cavity length. Thinner filters are less sensitive to the incident angle, as the internal reflections in the filters cover less distance for non-perpendicular incidence. A thicker filter will suffer from a larger displacement D of the transmitted beams, ranging well over 10 mm. This leads to a severe reduction in spatial and spectral resolution, as the light that passes through the filters will fall onto other rows or columns of pixels. This macroscopic filter hence requires a focusing lens. The thin filters are much less sensitive to this and the displacement D stays in most cases below the pixel dimensions, i.e. preferably in the 1 to 10 nm range, for all but the largest angles of incidence and the smallest pixels sizes. Traditional production techniques, in combination with hybrid integration of the filter structure and the image sensor, can not reach the required accuracy to fabricate Fabry-Perot filters of the first order. Hence, higher order Fabry-Perot structures have to be used. In that case, additional dichroic or other filters have to be added to the module, in order to select the required order only. This gives rise to additional energy loss, additional costs and hence reduced overall system optimality.

Finally, when a Fabry-Perot filter is placed some distance away from the image sensor, the output of the filter exhibits phase differences that, when focused by a lens, take on the form of concentric circles. The concentric circles are a result of the different interfering waves where you have at different locations constructive and destructive interference. The focusing lens is needed for macroscopic filters because of the large distances covered by reflections inside the filter and in order to focus all these reflections back onto one pixel. In the disclosed integrated imaging module, the distance between the filter structure and the image sensor is very small and as the filter is designed for the first order, there is no need for a focusing lens. Thin filters don't need this focusing lens, because internal reflections cover much smaller distances and in the case of the proposed filter, all light still falls in one pixel (after a very large number of internal reflections, the energy that is left in the light ray that exceeds the size of a single pixels is negligible). The concentric circles that are the result of the phase difference, will still be there, but will all be focused inside the same pixel and their effect is all integrated in the output of that pixel.

The direct post-processing of the filter structure on top of an active IC, in this case the image sensor, should be compatible with the contamination, mechanical, temperature and other limitations of that IC. This means that e.g. none of the steps used in the fabrication of the filter can use materials or processing steps that would damage the image sensor below.

As will be discussed below, one of the most important limitations is the restriction on the available materials, taking into account the CMOS production environment. In the proposed filter, the material selection has been done such that standard materials have been used, that are fully compatible with standard processing. Using some materials is not possible, e.g. Au or Ag, as they tend to diffuse into the different layers and into the tools and thereby negatively affect the yield of the current and even future processing steps. In some cases, such a layer can still be acceptable as a final step (top layer), when the deposition is done outside of the normal processing line and when the tool is only used for that purpose. This can only be done as a final step, as the wafer can not enter the normal flow after this operation. Another limitation, related to the material selection, is the temperature budget or the temperature window that is still available for processing. In order to perform the post-processing without damaging the image sensor. To prevent damage, the maximal temperature of the processing steps should not exceed a certain maximum, e.g. 400 degrees C. This also restricts the choice of materials and crystallization that is available for the design. With respect to a hybrid approach, where the image sensor and a separately produced filter structure are assembled into a module later, there is less freedom here. In case of a monolithic design, the restrictions have to be taken into account throughout the design. If certain design choices can be made during the design of the image sensor itself, to relax the constraints on the processing of the filter (e.g. to raise the allowed temperature for post-processing), this can be taken into account too. This then leads to an optimization problem at the module level, instead of for the image sensor and the filter structures separately. The restriction on the filter structures always apply, as it is processed later and on top of the image sensor.

Optical Filter

Every pixel of the image sensor can have its own optical filter, sensitive to one specific wavelength. The organization of different optical filters on the sensor depends on its usage. A line scanner requires the same wavelength selectivity for every pixel on the same line, in which case it is here referred to as a line filter. Different types of filters exist. In one embodiment, the type that is used is the Fabry-Perot interferometer.

Figure 2A:
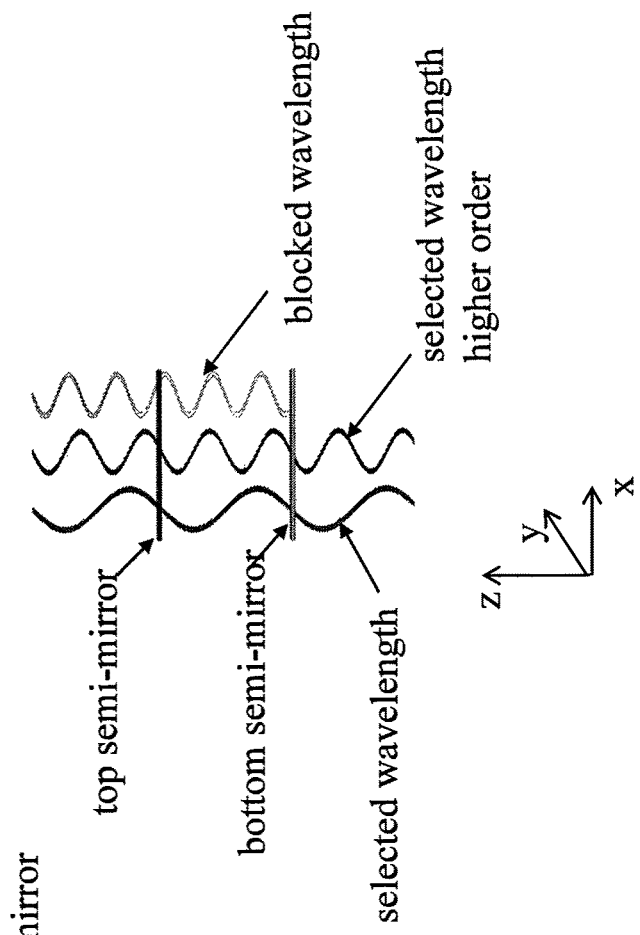
FIG. 2 shows an optical filter using Fabry-Pérot wavelength selection. (a) Fabry-Pérot working principle, with multiple light rays being reflected, which results in constructive and destructive interference, based on the wavelength of the light, on the distance 1 between the semi-mirrors and the incident angle θ. (b) Higher orders are also selected, which results in an order selection problem.
Figure 2B:
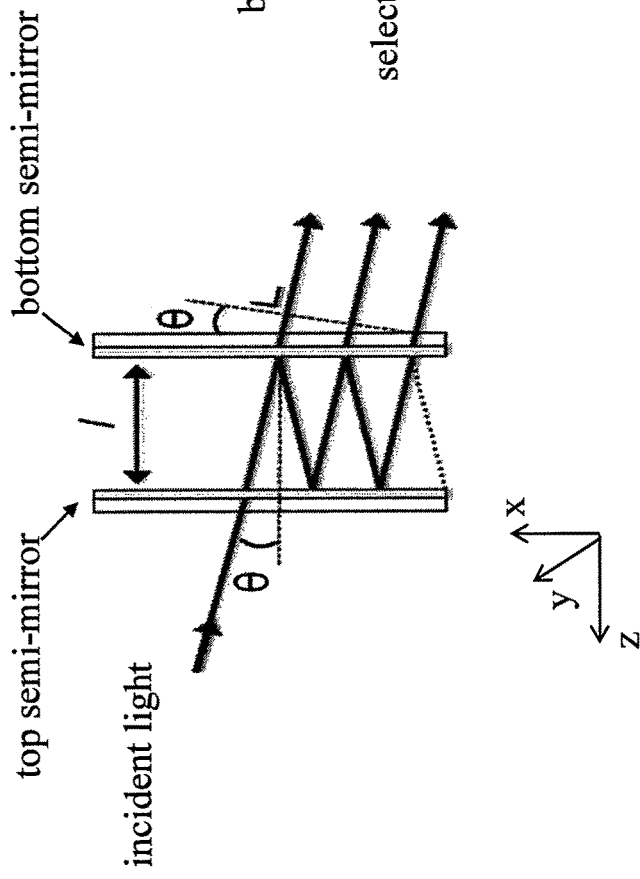

Fabry-Perot Filter:

FIG. 2 shows Fabry-Perot wavelength selection. (a) Fabry-Pérot working principle, with multiple light rays being reflected, which results in constructive and destructive interference, based on the wavelength of the light, on the distance l between the semi-mirrors and the incident angle θ. (b) Higher orders are also selected, which results in an order selection problem. The filter operation is based on the well-known Fabry-Pérot principle, in which the height of each step is tuned to the filtered spectral band. Each step forms a resonant cavity of which the resonance frequency is determined by the height of the step. On the top and bottom of the cavity, a semi-transparent mirror is placed to partially reflect the light ray. Because of the reflections, an optical path difference is introduced resulting in destructive and constructive interference (depending on the incoming wavelength), as shown in FIG. 2 a.

The Fabry-Perot Filter is made of a transparent layer (called cavity) with two reflecting surfaces at each side of that layer. The transparency and reflectivity of the surfaces have to be considered with respect to the wavelength range that the Fabry-Perot filter is targeted at. The transmission of the light as a function of the wavelengths shows a narrow peak around a central wavelength corresponding to the resonance in the cavity. As indicated in FIG. 2a, light in the cavity is reflected multiple times, introducing a path length difference and a phase shift for light passing through the filter. The multiple light rays at the output cause interference depending on the phase shift introduced in the cavity. The many interfering light rays lead to a very selective optical filter for which the transmission function is given by Equation 1.

$$T_e = \frac{T^2}{1 + R^2 - 2R\cos\delta} \quad (1)$$

with δ the introduced phase shift (for an incident angle θ) equal to:

$$\delta = 4\frac{\pi}{\lambda}\cos\theta \quad (2)$$

Constructive interference occurs when this phase shift is equal to zero or a multiple of 2. In that case, the numerator and denominator of equation 1 are equal and the transmission is 100%. Equation 3 describes the transmission of the Fabry-Perot filter as a function of the length, angle of incidence and refractive index of the cavity. From this equation, a Fabry-Perot filter can be designed for a certain wavelength, by varying the cavity length. In case of constructive interference occurs the numerator and denominator of Equation 1 are equal and the transmission is 100%. Equation 3 gives the relation between the wavelength for which the transmission is 100% as a function of the length, angle of incidence and refractive index of the cavity. From this equation, a Fabry-Perot filter can be designed for a certain wavelength, by varying the cavity length l.

$$m\lambda = nl \cos\theta \quad (3)$$

Figure 3:
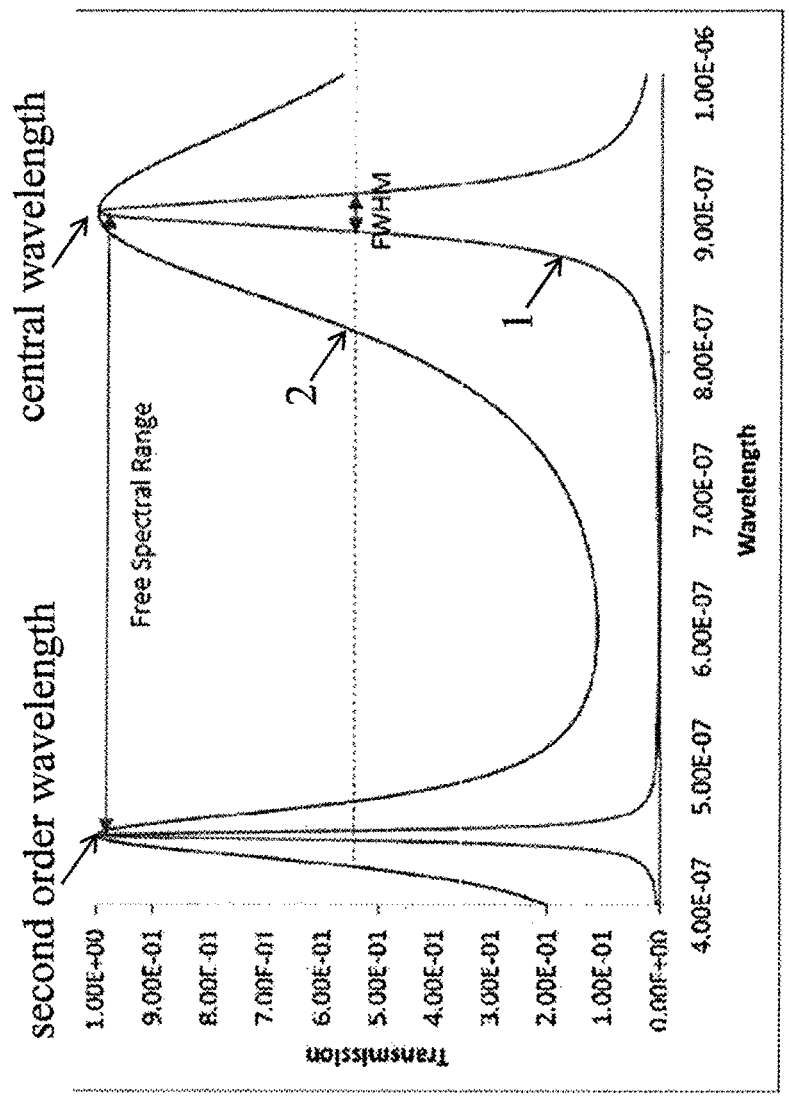
FIG. 3 shows the definition of optical parameters of a filter.

The central wavelength of the Fabry-Perot filter is only one of important optical parameters. As constructive interference always happens when the phase shift is equal to a multiple of 2, multiple wavelengths, called higher orders, will pass the filter. As indicated in FIG. 3, the wavelength separation between two transmission peaks of the filter is called the Free Spectral Range. The larger this parameter, less problems with higher orders wavelengths will occur. A Fabry-Perot interferometer designed for first order wavelength will provide a maximum Free Spectral Range. Indeed, for a central wavelength of 700 nm in first order, the Free Spectral Range is 350 nm to the second order at 350 nm. If the central wavelength in first order is 1400 nm, then 700 nm is selected in second order and the third order is 466 nm, which reduces the Free Spectral range to 233 nm for 700 nm. A second parameter is the quality of the filter, which is defined as the bandwidth of the filter relative to the central wavelength. The bandwidth is expressed ad the Full Width Half Maximum or FWHM of the filter, which is defined as the width of the passband at half the maximum transmission, as shown in FIG. 3. A third parameter, also indicative of the quality of the optical filter, is the finesse F of the Fabry Perot interferometer defined in Equation 4 as the relation between the Free Spectral Range $\Delta\lambda$ and the FWHM $\delta\lambda$. For a fixed Free Spectral Range, a higher finesse automatically leads to a lower FWHM or better spectral resolution (see below). As shown in Equation 5, the finesse only depends on the reflectivity of the reflecting surfaces. The higher this reflectivity, the higher the finesse and the narrower the bandwidth or FWHM of the optical filter for the same Free Spectral Range will be.

$$F = \frac{\Delta\lambda}{\delta\lambda} \quad (4)$$

$$F = \frac{\pi \cdot \sqrt{R}}{1-R} \quad (5)$$

Figure 4:
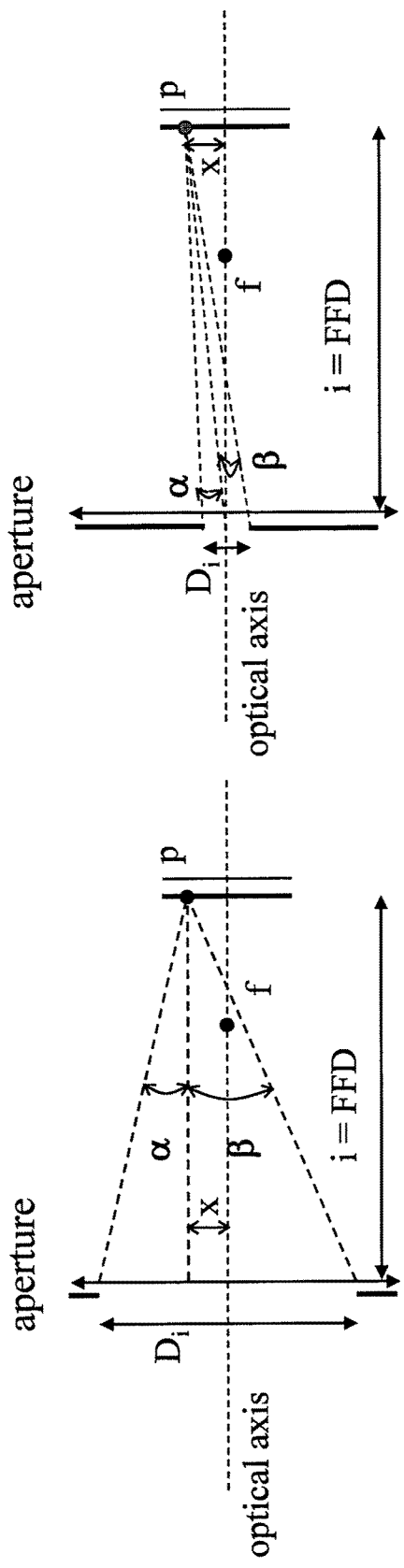
FIG. 4 shows the dependence of angle of incidence onto wedge on the size of the exit pupil.

FIG. 4 shows two Fabry-Perot interferometers with equal cavity length but with different reflecting surfaces. The angle of incidence was 0° and the cavity was filled with air with a refractive index equal to 1. This leads to two different filters with different Full Width Half Maximum for the same Free Spectral Range. The cavity of both filters is 450 nm resulting in a central wavelength of 900 nm and a second order wavelength at 450 nm. The two different implementations have respectively a low (2) and high (1) finesse resulting in low (2) and high (1) FWHM for the same Free Spectral Range.

A fourth parameter for the Fabry-Perot filter is the spectral resolution, i.e. the minimal difference in central wavelength of two neighboring spectral bands that can be resolved. This parameter depends on both the position of the central wavelength and the bandwidth of the filter. Two neighboring spectral filtered bands are the to be distinguishable if the peak in their transmission characteristic crosses at half the maximum (the 3 dB point) or below, i.e. at or below the location where the FWHM is calculated. When relating the location of a single filter to the sampling of a complete wavelength range, it is assumed that the length of the cavity can be controlled very precisely during processing and that one is able to position next spectral band so that its 3 dB point actually crosses in that 3 dB point. If the spectral range of interest is then sampled with a range of line filters, each positioned such that their pass band crosses at the 3 dB point, the spectral resolution of the hyperspectral module is equal to the FWHM of the optical filters, under the assumption that the FWHM of two neighboring filters is the same.

Figure 5:
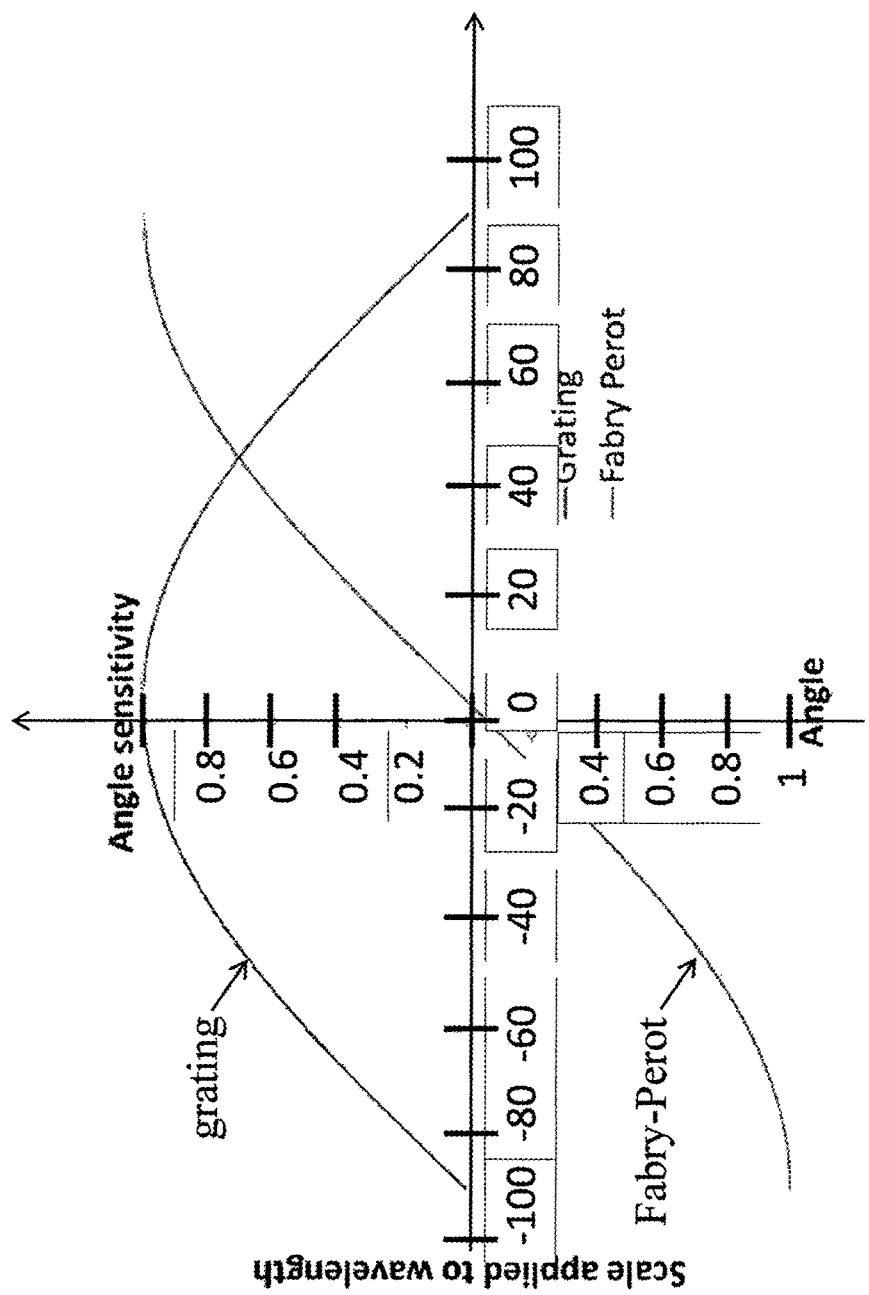
FIG. 5 shows the sensitivity of an optical filter in the form of a Fabry-Perot interferometer to the incident angle.

As indicated in equation 3 and illustrated in FIG. 5 the central wavelength of the interferometer depends on the angle of incidence of the light. For a Fabry-Perot filter, this dependence is a cosine relationship, which is not very sensitive at angles around 0°, i.e. light perpendicular to the surface of the optical filter. This is in contrast to gratings, for which the dependency of the wavelength selection follows a sine relationship, which is much more sensitive to variations around 0° degrees. A Fabry-Perot interferometer can tolerate slight variations on the angle of incidence. This feature can be used at the systems level to improve on speed, sensitivity, etc.

Design of the Optical Filter

The design and performance of the reflecting surfaces on both sides of the cavity are crucial to the performance of a Fabry Perot optical filter. A Fabry-Perot optical filter with high finesse, and thus good spectral resolution, can only be obtained by using highly reflective mirrors. A second important parameter of the mirrors is their absorption, as this will determine the efficiency of the filter. If a full range of Fabry-Perot optical filters has to be constructed over a certain wavelength range, it is beneficial that these two parameters (reflectivity and absorption) stay as constant as possible over this spectral range. In that case, the wavelength range can be covered/sampled by varying only the cavity length of the Fabry-Perot filters and the materials and mirror layers can be kept constant. The selected wavelength range has to match the sensitivity of the selected image sensor, which is the second component of the module Current solutions proposing monolithic Integration use specific non-standard sensor designs, increasing the cost or decreasing the speed. Switching to CMOS compatible processing steps on CMOS sensors raises integration issues as it has consequences on e.g. the material selection, due to contamination and temperature budget. Metals like Ag for the bottom mirror can't be used. State of the art Fabry-Perot filters needs to use Al, causing a serious decrease of the filter quality or optical throughput (speed). Dielectric stacks are preferred but the contamination level and temperature budget limits the material selection. Process compliant materials needed having the correct combination of n/k to obtain the needed spectral range in the selected frequency range. An example of these dielectric materials having low n material is $SiO^2$, possibly tuned to decrease n even further. An example of a high-n material is amorphous silicon, with reduced absorption index because of process parameter tuning, e.g. temperature and hydrogen content. Hard oxides have better tolerances but cannot be used because of the need for higher temperatures than allowed by standard CMOS processing.

An example of such alternative mirror system is a (distributed) Bragg stack, which is formed by combining two types of dielectrics into an alternating stack of two or more materials: one with a low refractive index and one with a high refractive index. A first characteristic of a Bragg stack is its bandwidth, as given by equation 6, i.e. the spectral range $\Delta\lambda_0$ over which the reflectivity is more or less constant.

$$\Delta\lambda_0 = \frac{4\lambda_0}{\pi} \arcsin\left(\frac{n_2 - n_1}{n_2 + n_1}\right) \quad (6)$$

From this equation, it can be seen that the bandwidth $\Delta\lambda_0$ depends on both the central wavelength $\lambda$ and the refractive indices $n_1$, $n_2$ of the selected materials. To be able to cover a wide spectral range, around a certain central wavelength (e.g. 600 nm spectral range around 700 nm), a big difference between $n_1$ and $n_2$ is needed. From the list of materials that are used in standard semiconductor processing, $SiO^2$ has one of the lowest refractive indices (1:46) and a very low absorption coefficient. Both parameters are stable over a very large spectral range. For a spectral range of 600 nm around a central wavelength of 700 nm (the VNIR range), this means that the second material in the Bragg stack will ideally need to have refractive index equal to 6:4, in addition to an absorption coefficient as close as possible to 0. There is no such ideal material available in the standard IC processing materials, compatible with the process flow, and adapting existing materials for a better refractive index and lower absorption is needed. The refractive index of $SiO^2$ can be lowered by making it porous (mix it with air, which has a refractive index of 1). This results in a need for better manufacturable refractive index equal to 5 for the same spectral range and central wavelength. Another example of material engineering is lowering the absorption index of amorphous silicon by changing process (deposition) parameters, like temperature, concentration of hydrogen, etc.

$$R = \left[ \frac{n_0(n_2)^{2N} - n_s(n_1)^{2N}}{n_0(n_2)^{2N} - n_s(n_1)^{2N}} \right] \quad (7)$$

As indicated by Equation 7, the reflectivity R of such a Bragg mirror is easily controlled by the number of pairs of dielectric layers. The more layers, the higher the reflectivity and the higher the finesse of the Fabry-Perot filter that will be built with that particular mirror. In Equation 7, $n_0$ is the refractive index of the surrounding medium, $n_2$ is the refractive index of the substrate, ni is the refractive index of the first material, $n_2$ is the refractive index of the second material and N is the number of pairs in the Bragg stack. One instantiation of a distributed Bragg stack is a combination of $SiO^2$ and engineered amorphous Silicon for a central wavelength around 700 nm and a range from 540 nm to 1000 nm. A second instantiation is a combination of $SiO^2$ and SiGe for a central wavelength of 1500 nm and a bandwidth of 1000 nm, in casu from 1000 nm to 2000 nm. A consequence of using Bragg stacks for the mirror layers is an additional phase shift during the reflection of the light. This phase shift causes the central wavelength to deviate from the one given by Equation 3, but this deviation can be easily determined using, for example, simulation tools.

Wedge Filter

Figure 6A:
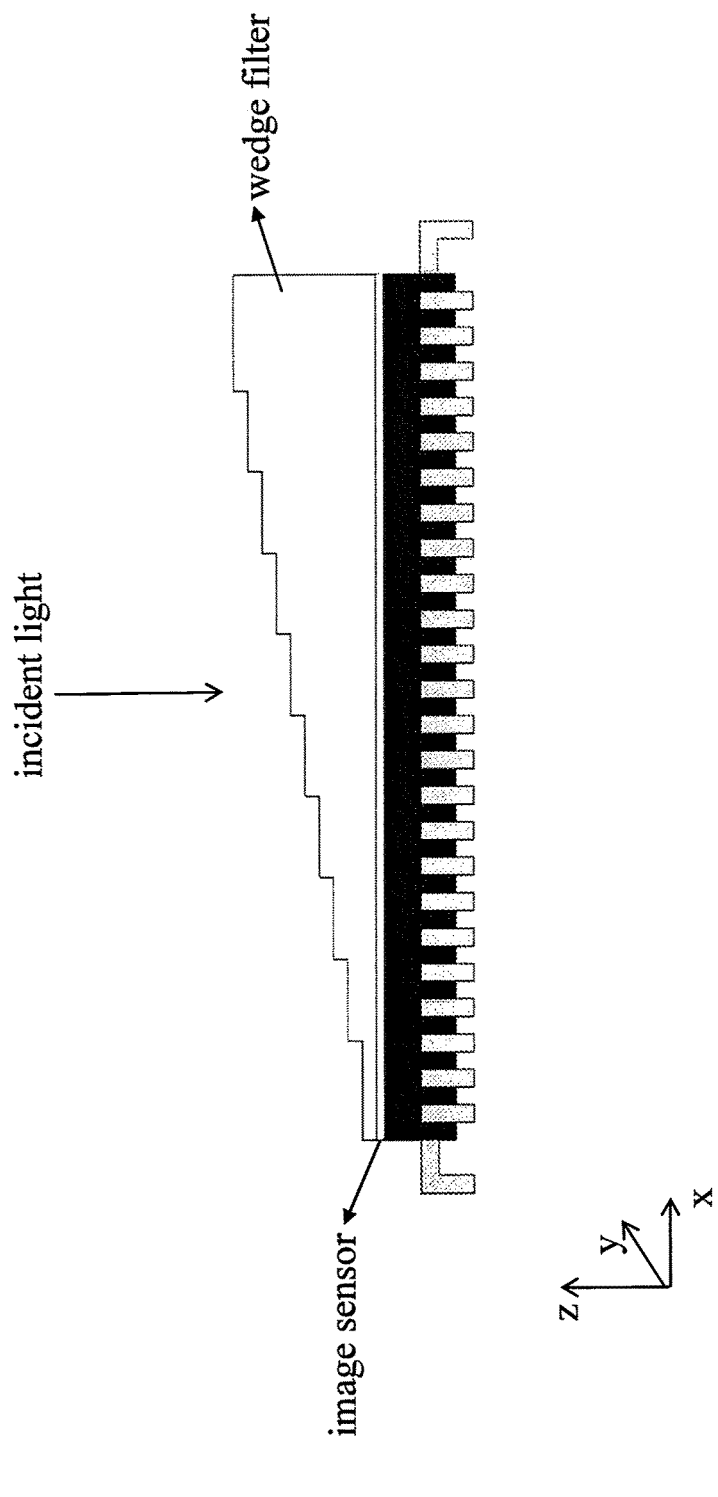
FIGS. 6a-b show an integrated imaging system (a) cross-section (b) Topview.
Figure 6B:
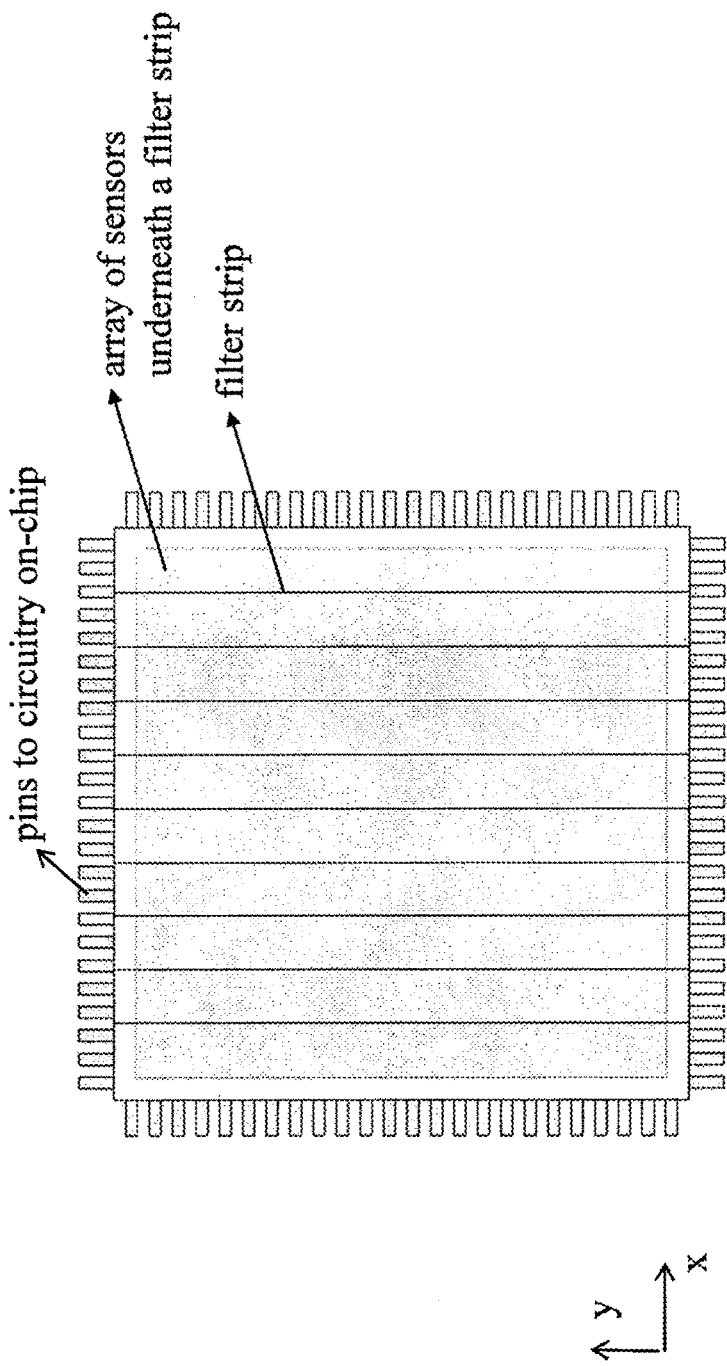

A wedge filter as shown in FIGS. 6a-b is an optical filter consisting of a step-like structure. These steps can be ordered to be of increasing height, in which case they form a monotonic wedge-like structure. However this ordering is not required i.e. non-monotonic structures are also possible. The filter is post-processed, i.e. monolithic integrated, on top of an image sensor and every step is aligned with a single of multiple rows or columns of the image sensor. Every step of the wedge filters out a different spectral band. As a result, the sensor and wedge filter combination can be used in hyperspectral imagers of the pushbroom, line scanner type or the hybrid line scanner/starer type.

Existing wedge filters are sloped structures instead of stepped structures. Due to the lower fabrication complexity, up to now sloped structures have been used. However, they are only an approximation of the desired filter, which should have a constant height for every group of sensor pixels that are intended to sense the same spectral band. This group can be arranged as a row or column or any other ordering. In the rest of this description it is assumed that the pixels that sense the same spectral band are arranged as rows or columns. Therefore the preferred structure of the wedge filter is the step structure, in which each row or column of pixels (or groups thereof) is covered with a Fabry Pérot filter of different height. The staircase structure results in different filter properties and a different selected wavelength for every (group of) row(s)/column(s), in this way resulting in a hyperspectral imager.

The filter of the above can have every step ordered to be of increasing height in which case they form a wedge. The filter can have the height of each step being tuned to a filtered spectral band.

The central wavelength of the Fabry-Perot optical filter is determined using equation 3 and can be tuned by changing: the length L of the cavity and/or the angle of incidence θ of the light and/or the refractive index n of the material in the cavity The variable cavity allows building line filters for different wavelengths by varying the cavity length L over the sensor in one direction (x or y) while keeping the 2nd dimension fixed. By varying the cavity lengths, it is possible to keep the cavity material (and its refractive index) constant. Different lines on the sensor are then sensitive to different wavelengths. Using equation 3, one can calculate the difference in height H between neighboring lines for a given spectral resolution. An implementation is given in FIG. 6, which varies the length of the cavity linearly over the sensor with the same step height between the different steps (note that the height difference between the steps is exaggerated for illustrative purposes). The width W of the different steps then depends on the number of spectral bands/spectral resolution and the width of the sensor.

This embodiment can be easily implemented using binary masks, as explained later on. One implementation is shown in FIGS. 7a-7e, which illustrate the variation of the selected wavelength over the complete sensor. At the left side of FIG. 7a, the filter characteristic is shown for a line filter with a central wavelength which has very low transmission efficiency, because the reflectivity of the used mirror layers is not yet optimal in this wavelength range. The central wavelength gradually increases for increasing wavelengths, with a big increase in transmission efficiency at step 20 (around 600 nm), as the reflectivity of the Bragg stacks reaches the targeted performance. The central wavelength further increases until 1000 nm around step 120 with a second order appearing at step 95. The appearance of the second order is the result of the fact that a Fabry-Perot filter which is designed for wavelength $\lambda_j$ also passes incoming wavelengths that are a multiple of $\lambda_j$, called higher orders. However, only those higher order wavelengths that fall in the wavelength range for which both the Fabry-Perot filter and the underlying image sensor have a reasonable efficiency should be considered.

Figure 7A:
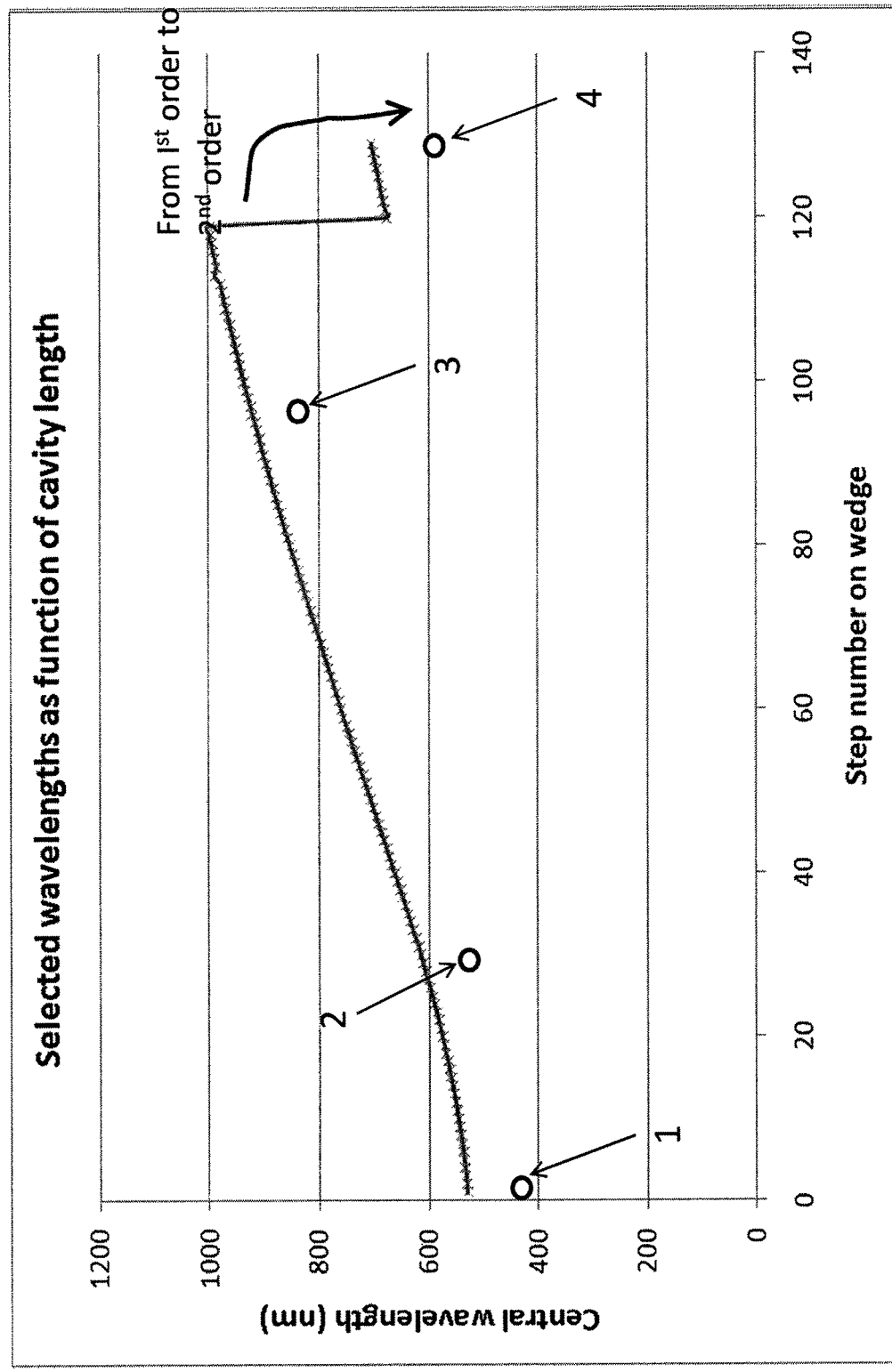
FIG. 7a illustrates the variation of selected wavelengths as a function of cavity length for a Fabry-Perot interferometer.
Figure 7B:
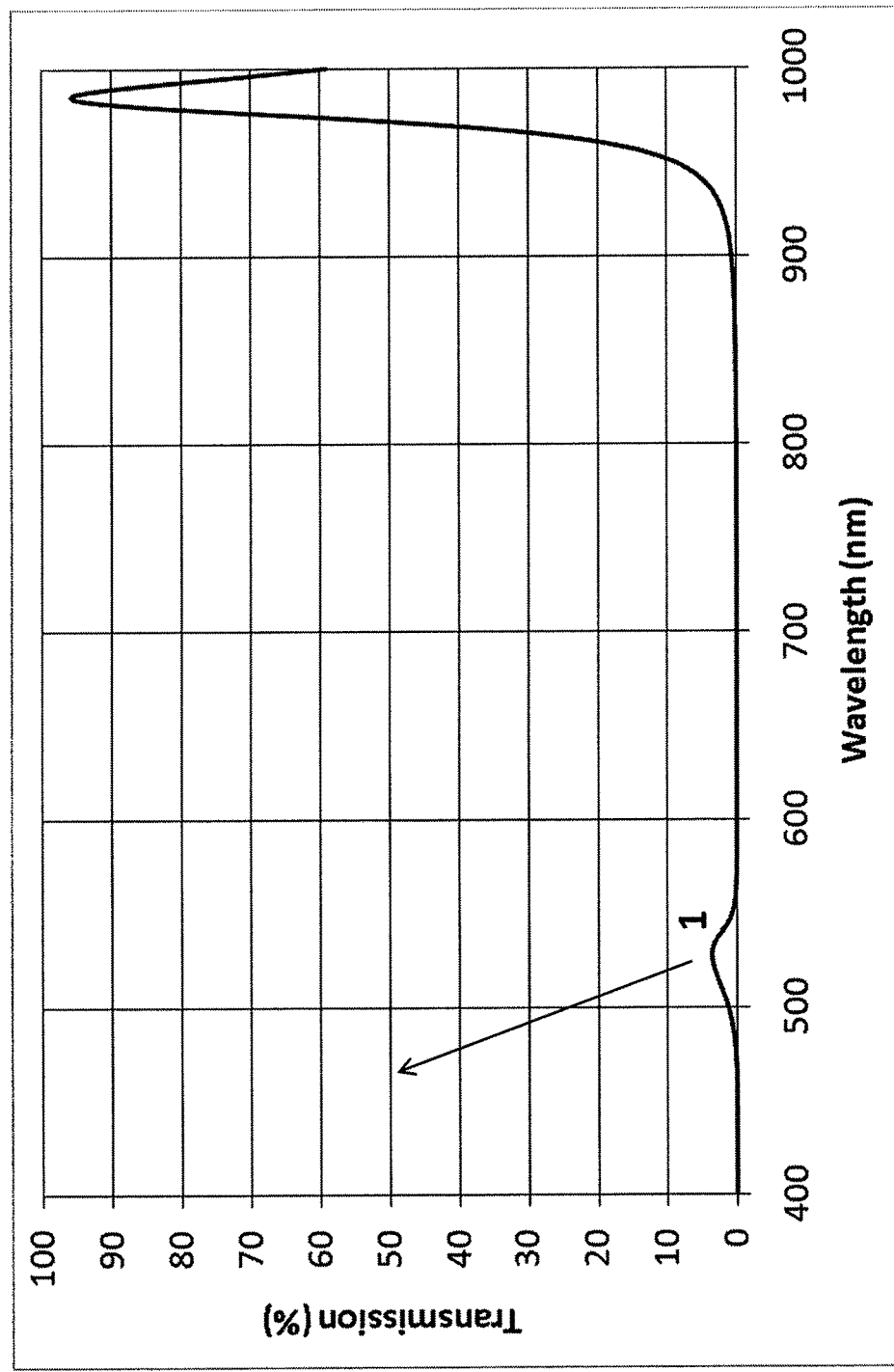
FIGS. 7b-7e illustrate transmission spectra at specific cavity lengths annotated in FIG. 7a, according to embodiments.
Figure 7C:
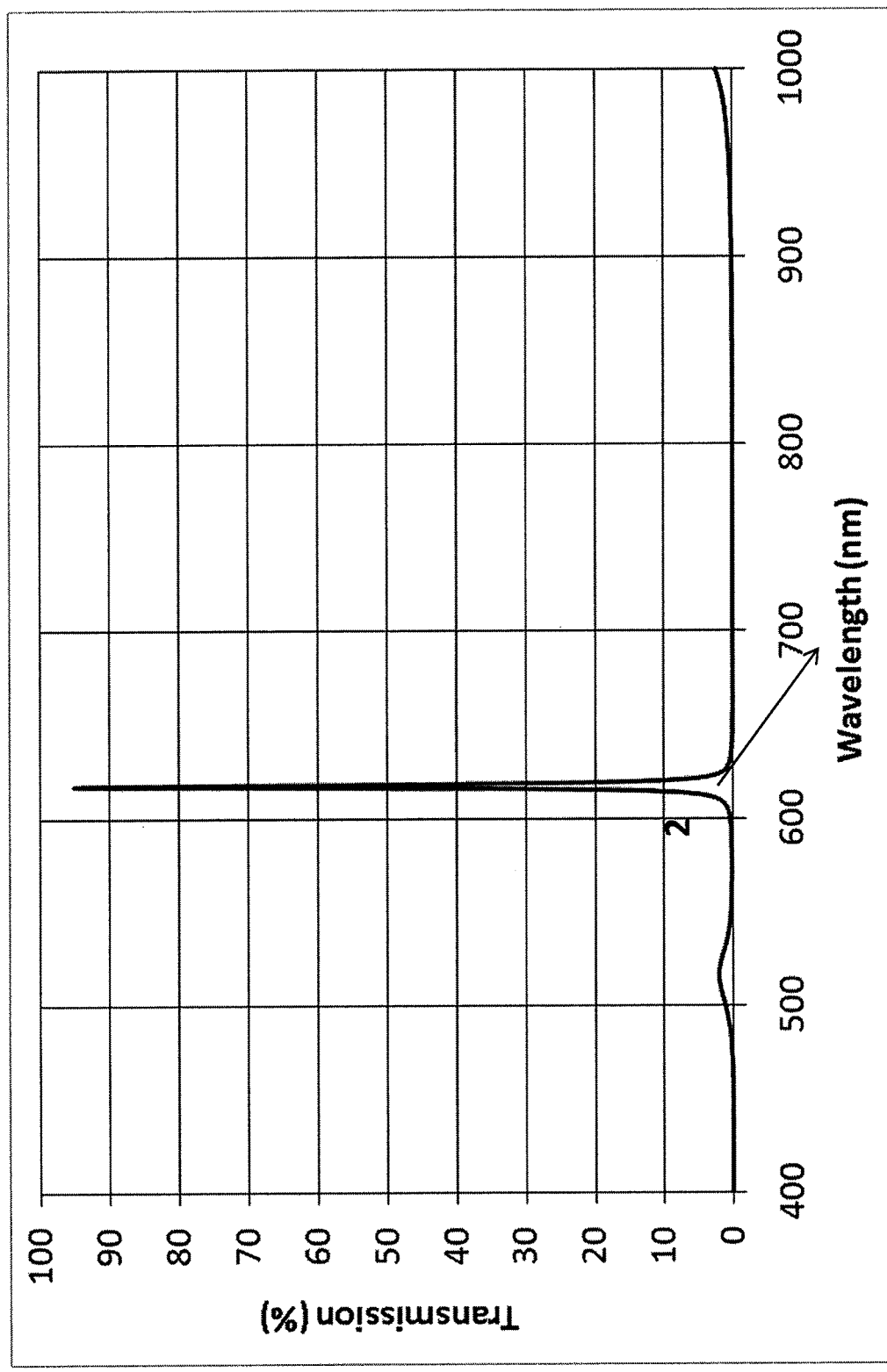
Figure 7D:
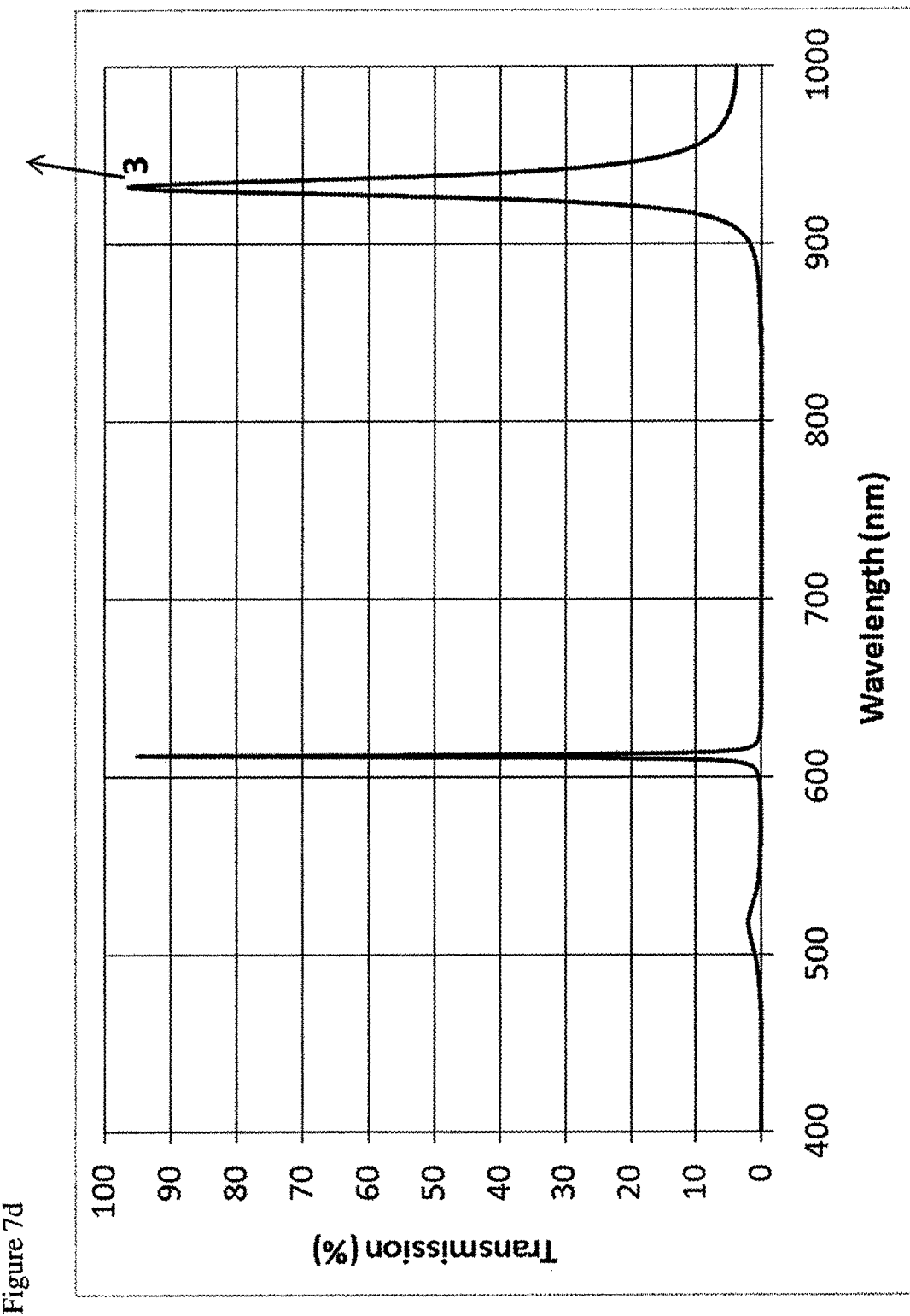
Figure 7E:
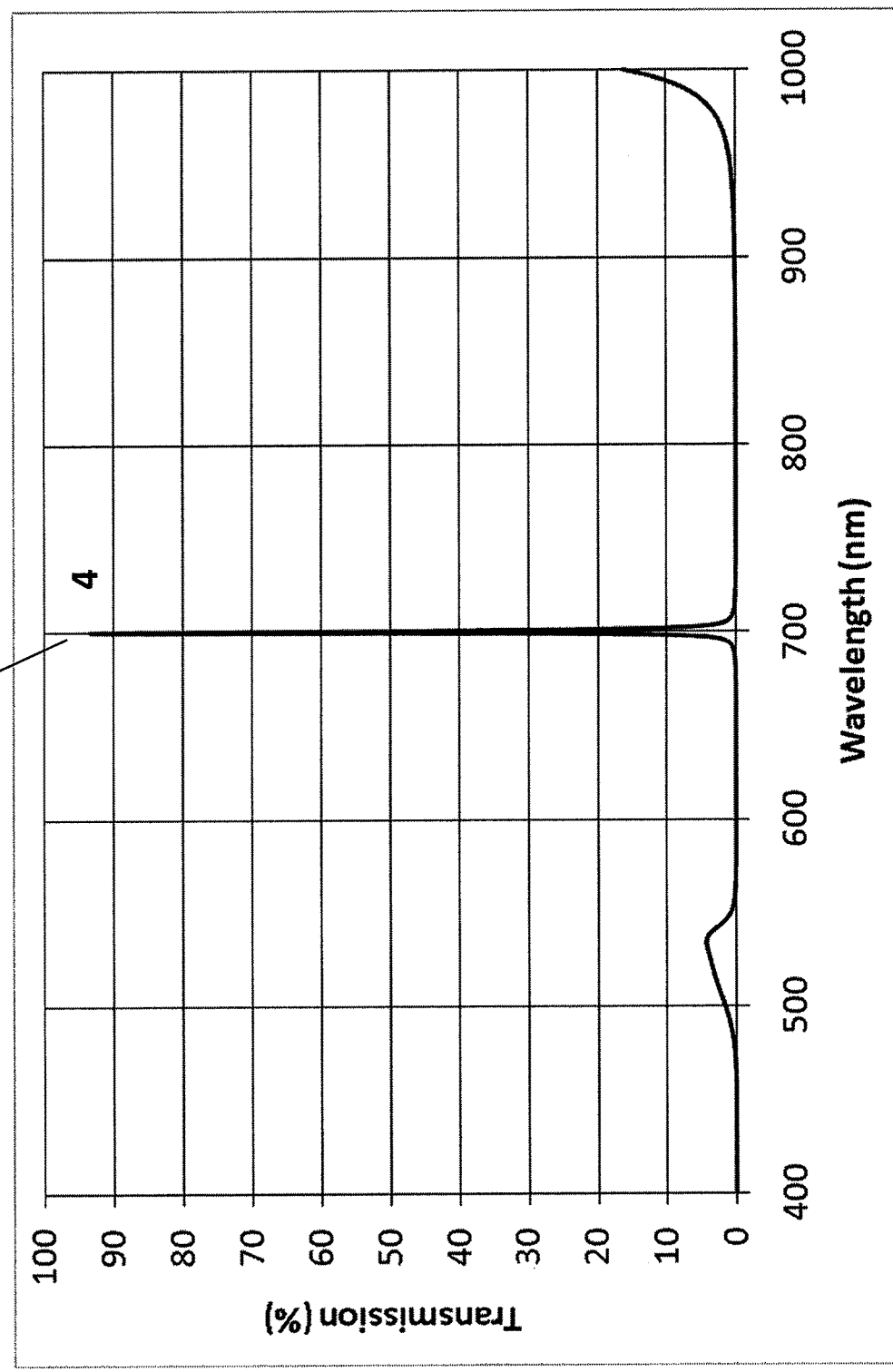
Figure 8:
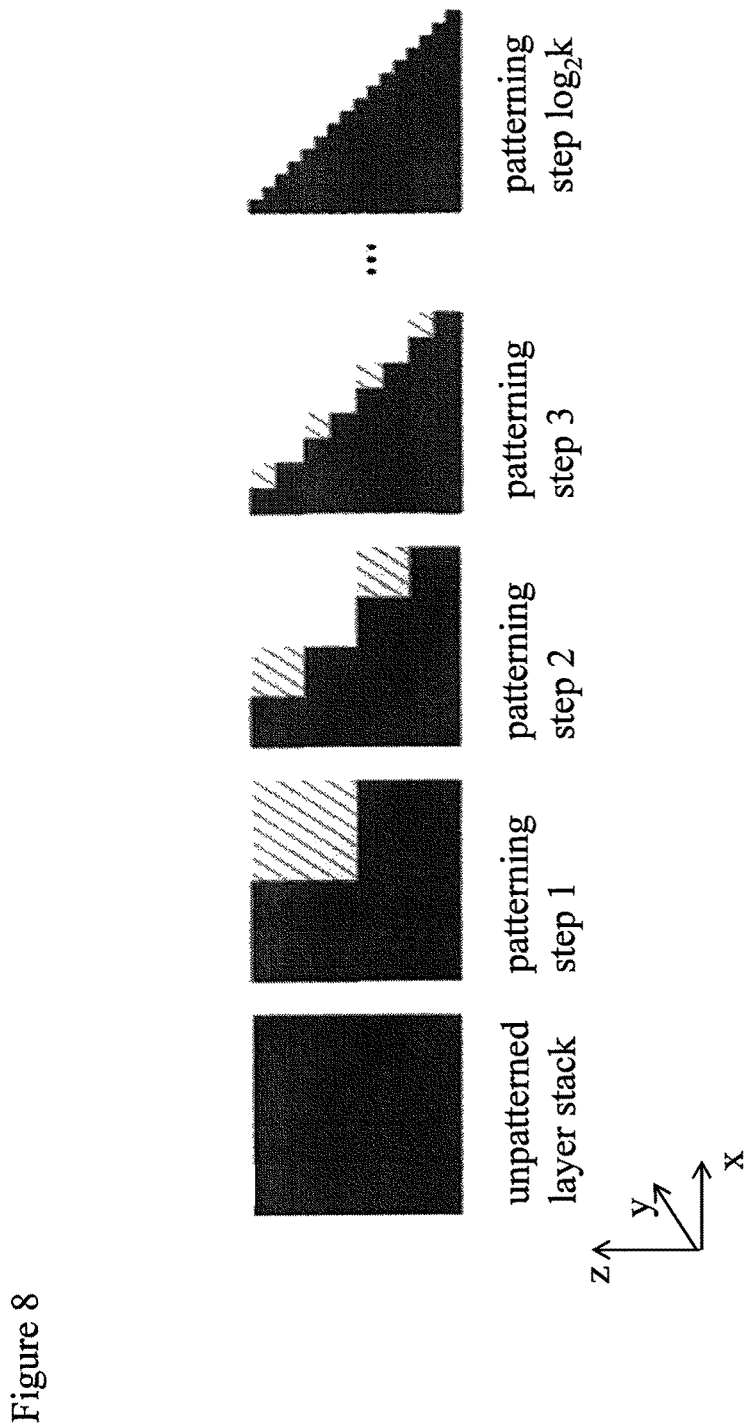
FIG. 8 shows the principle of binary or logarithmic patterning of a step-like structure.
Figures 9C, 9D:
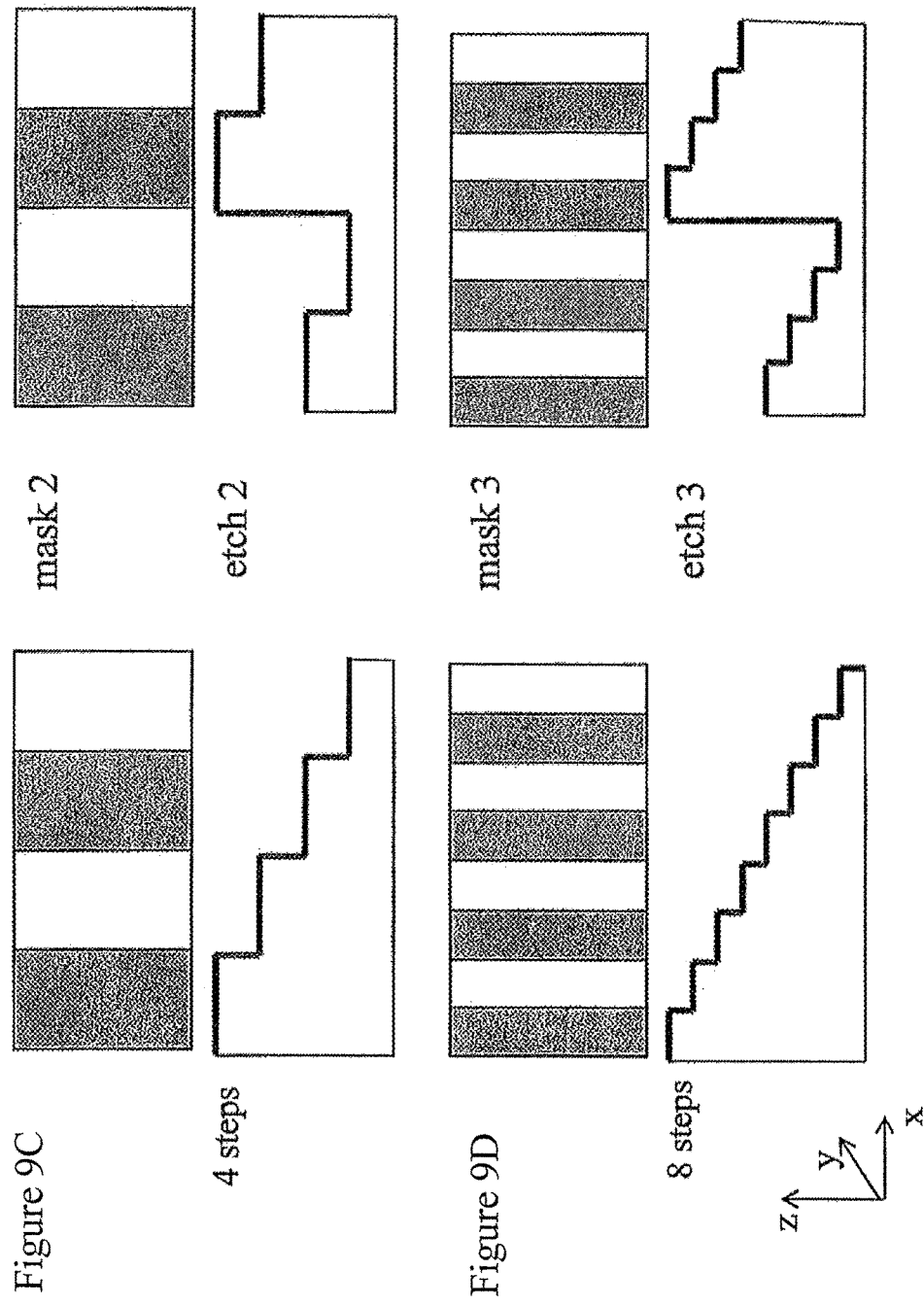
FIGS. 9-a to e shows a schematic process flow for manufacturing a Fabry-Perot interferometer.
Figures 10C, 10D:
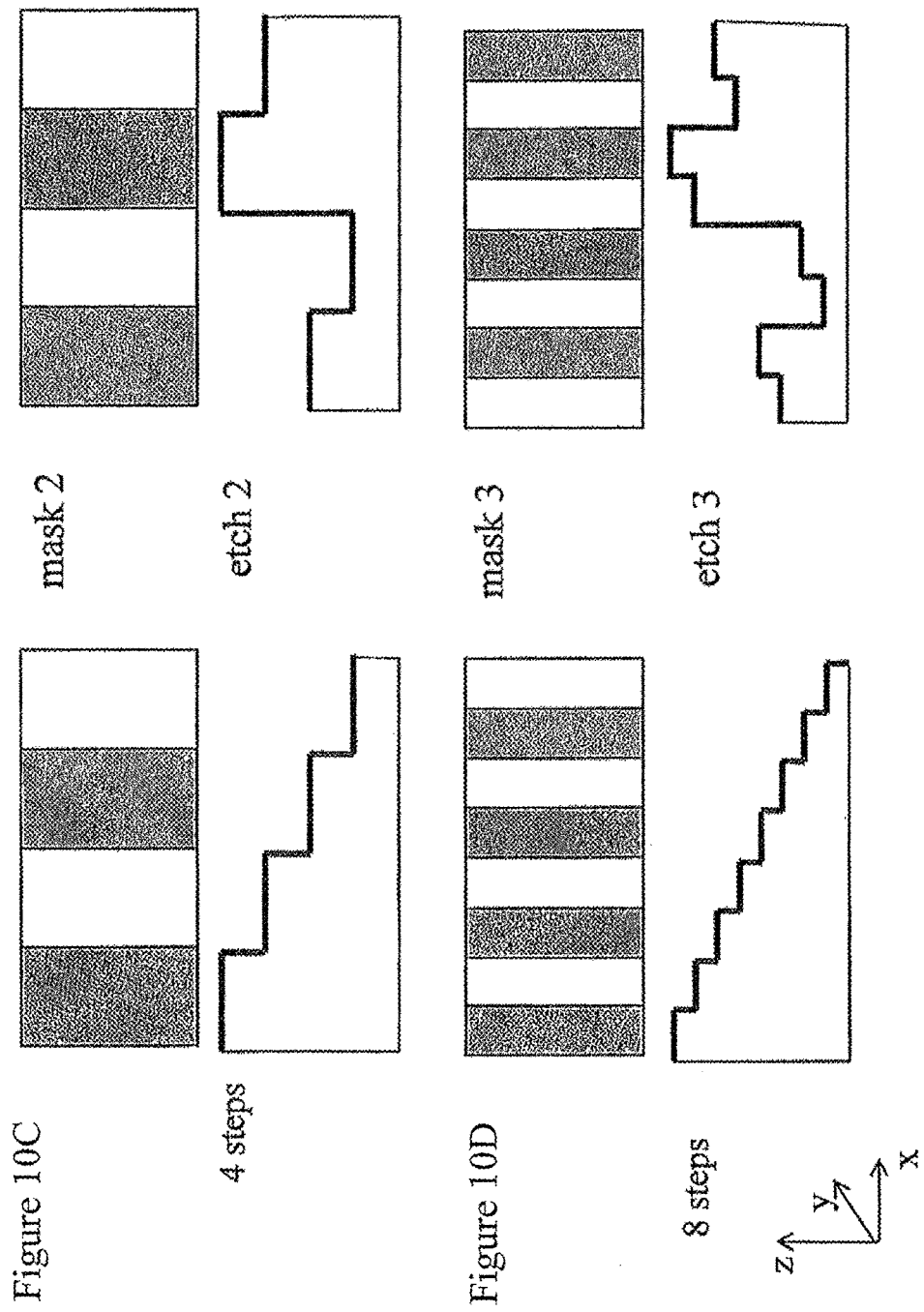
FIGS. 10-a to e shows an alternative schematic process flow for manufacturing a Fabry-Perot interferometer.
Figure 10E:
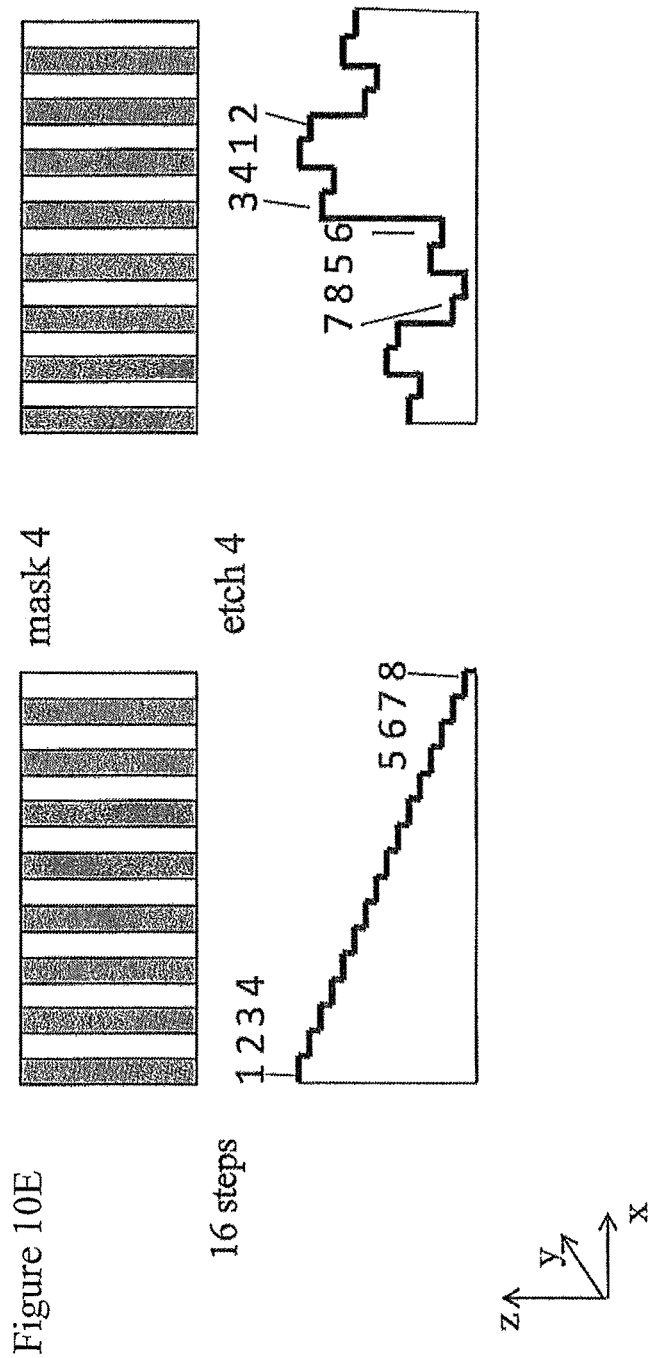

The preferred way to change the cavity length will have problems with variations in the structure introduced during processing. Referring again to FIG. 7a, in the VNIR range, the affected wavelength range is approximately from 800 nm onwards. As a typical CMOS sensor is not sensitive to wavelengths larger than 1000 nm, FIG. 7a shows a drop in the transmission above 1000 nm, as only the second order is transmitted and FIG. 7a shows a selected wavelength that drops back to 700 nm. The first and last region of this wavelength selection seem to capture only uninteresting information, as the transmission of the filter in those wavelength regions is too low or only second order information is recorded. However, these areas enable the effective spectral range to shift to the left or the right when tolerances are introduced during processing causing a global shift of the filtered wavelength range in either direction or in variations between different dies.

Manufacturing

Fabrication methods for manufacturing 1D or 2D Fabry-Perot filters can include binary or logarithmic construction of the staircase. A straightforward implementation of the staircase structure, using successive patterning and etching steps, would require a large number of processing steps in order to produce a staircase with k steps, with k typically being larger than 50. By using a so-called binary or logarithmic patterning, the number of required steps can be reduced to log 2 k, as illustrated in FIG. 5.

As a result of the binary patterning, e.g. 1024 steps can be constructed by using only 10 patterning steps.

In order to keep the processing costs under control, in particular the number of required etch steps to produce the different line filters having different thicknesses, techniques like binary or logarithmic masks can be used as illustrated in FIGS. 9*a-e* or in FIGS. 10*a-e*. To illustrate how the different topography is created by inverting masks optical filters manufactured during the same process steps are given the same reference number in FIG. 10*e*. To reorder the line filters, without increasing the cost of the module, the requirements for the logarithmic masks should be still fulfilled. However, it is possible to achieve this reordering, or approximate it very closely while still achieving the target, by using the inverse of some of the normal binary masks, as will be obvious to those skilled in the art and only use 1D reordering However, this simple reordering of the steps will only affect the angle of incidence in the direction perpendicular to the line filters. In practice, this will lead to a more balanced and higher sensitivity for the sides of the wavelength range, but only in the middle of the sensor. This can still be useful for many applications, especially when the region of most interest is the center of the scanned image.

In order to compensate for the second dimension, i.e. along the length of the line filter, additional process steps are required, which will introduce a trade-off with cost. If the additional cost can be motivated, the average angle dependence can be compensated for by adding an additional variation in the second dimension. By varying the cavity length in the direction of the line filter, the effect of the variation in average incident angle can be minimized. For this technique, additional etching steps are required and the final cavity will have a varying thickness parallel to the length of the line filter.

In the present application non-monotonically rising (or sinking) wedges are used in order to absorb errors in the etching. The non-monotone nature can come from the fact that we etch one step of the wedge less long than necessary which results in the step being higher. The structure is thus continuously falling except for a few places. See also examples in FIG. 24, 25 or 26 described below.

Figure 25:
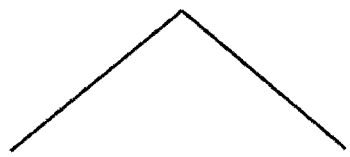
FIGS. 25 and 26 show alternative profiles for the thicknesses of the optical filters, having increases and decreases in thickness.

What is also useful is that we can also configure the patterning of the masks to achieve beneficial effects. See for example translating and/or inverting, as the result of which we get other types of wedges. Example—see the "hill" profile as shown in FIG. 25. This is a structure that is useful to compensate on the sensor for light fall-off. At the edges of the senor, you sometimes get vignetting which means a lower intensity of the light. On these places lie the regions of our wedge which have minimal sensitivity on the sensor, namely 400 nm and 1000 nm. Using the "hill" we can compensate for this. We match the sensitivity of the sensor to the sensitivity of the optical components which lie before it.

Particular examples of a complete HSI camera comprising the monolithically integrated subsystem are given later in this description. Designing a Fabry Perot for first order forces strict tolerances on the thickness of the several layers (in nm range), which are difficult to achieve with our low-cost processing flow (hardness, oxide, and so on . . . ). State of the art wedges (LVF and staircase) have increasing or even monotonically increasing thickness in one direction. Additional steps are needed to make this design more tolerant for process variation:

Manufacturing for Processing Variations and Tolerances

Figure 12:
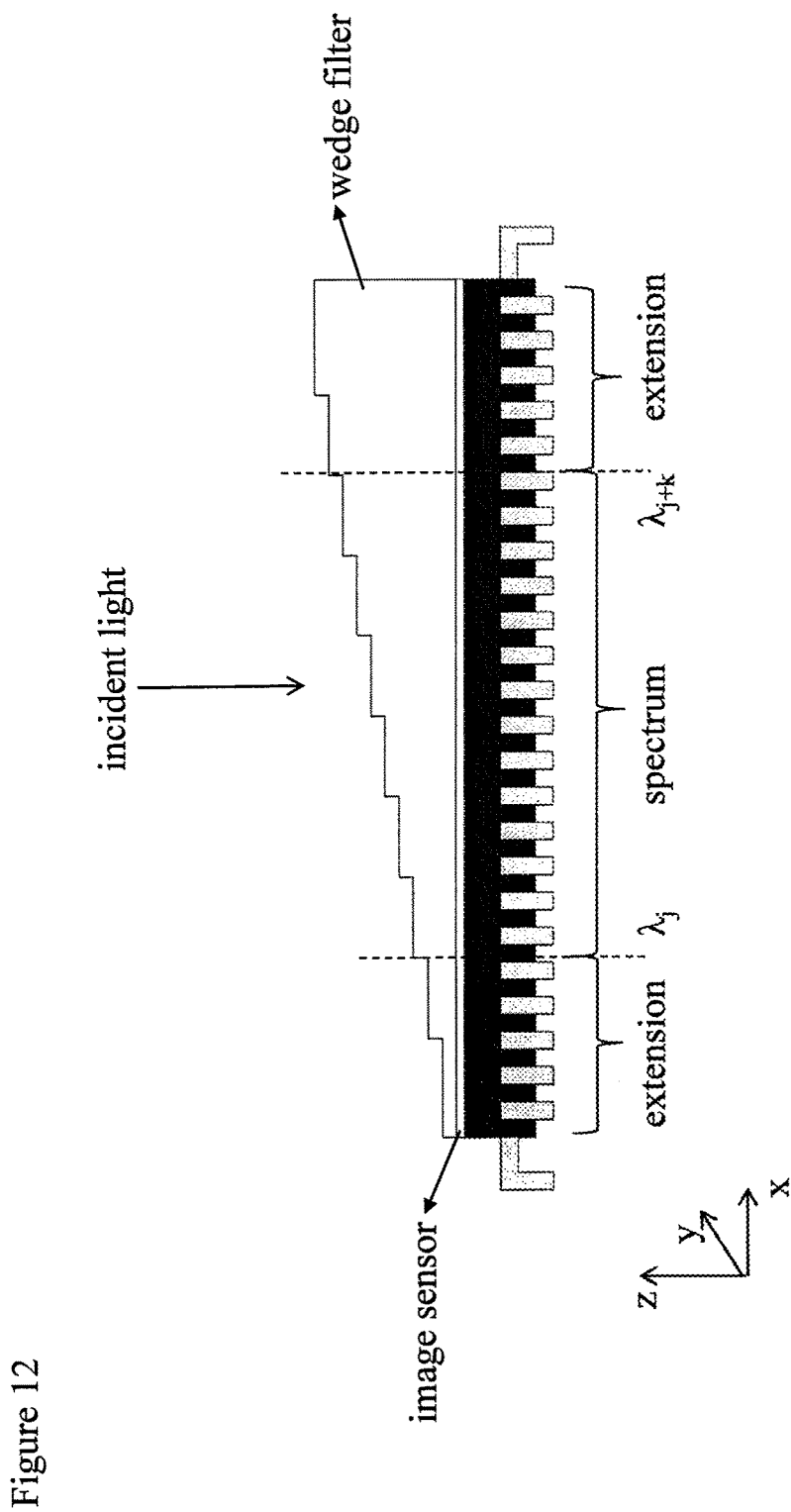
FIG. 12 shows an integrated circuit in the form of an integrated imaging system designed to tolerate processing technology tolerances.

As the processing technology requirements on the dimensions of the wedge filter are very strict, variations on step height, width, placement, corner sharpness and orientation can be expected. The design will be such that the nominal design targets a wider range of wavelengths than is required by the targeted applications, which corresponds to the insertion of extra steps into the wedge filter as shown in FIG. 12. As a result, a deviation of the produced height with respect to the nominal design, will cause a shift in the effective filter range to either side of the sensor. Through the insertion of the extra steps on each side, the wavelength range that is requested can still be recovered by reading out different columns of pixels (after a post-production calibration step).

Figure 11:
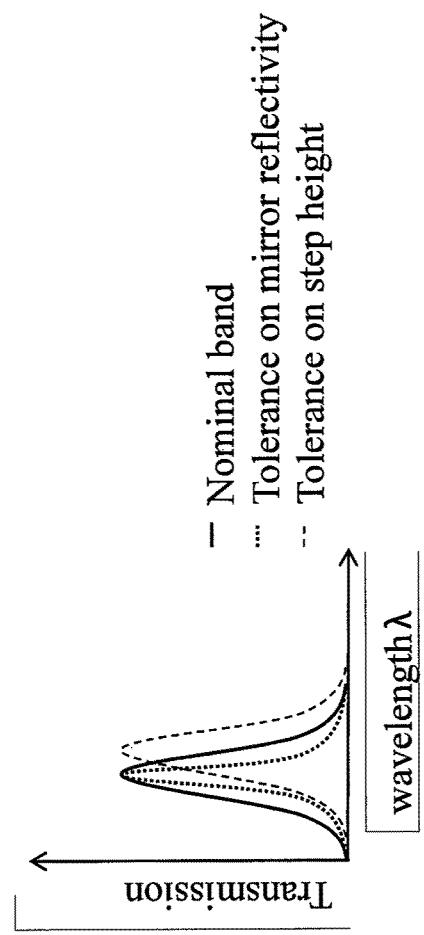
FIG. 11 shows the effect of processing tolerances on the filter characteristics.

The hyperspectral imaging filter set has been designed taking into account that various processing steps will always have tolerances as shown in FIG. 11. These tolerances occur on all normal steps of the fabrication and controlling them is usually a cost trade-off. Every processing step can be controlled up to a certain extent and this can be improved by investing in extra process development and refinement, up to a certain extent. As a result, for many steps it is very difficult to quantify the exact limits on these variations. The philosophy behind the current design is to prevent the expensive and time consuming optimization steps as much as possible by taking into account these variations, if the effect of the variation can be overcome by software corrections or modifications to the design. By taking this approach during the design, it is possible to propagate requirements down to the processing steps: taking the slack that is created by the tolerant design into account, the variations that occur in the processing steps should stay below a predefined threshold. This threshold is set at design time, based on the expected variability in the various processing steps. Variations above the threshold can no longer be compensated for and will result in modules that do not meet the specifications. The following sections introduce briefly some of the process steps and in which way they introduce a certain amount of variation and their effect on the filter structure as a result of the tolerances of that step.

Different types of tolerances or variations exist. The across the wafer variation (inter-die) will have different implications on the final device than the intra-die variations. In the following text, both are covered in general as tolerances or variation, unless specified otherwise.

The rationale behind the systems design is that the different filter lines of the hyperspectral imaging module will sample different points in the spectrum at a certain sampling interval. A first choice is to sample the spectrum with maximal spectral resolution. This rate can be derived from the rayleigh criterion, which states that two filters are spectrally resolvable if they cross in their 3 dB point. A second choice is to sample the spectrum at a reduced rate, e.g. Shannon's rate to cover all frequencies in the signal. In the latter situation, small variation in the effective filter location will not have an important effect on the use of the module to sample the spectral curve. Only applications that aim to detect very narrow spectral peaks at a certain well defined wavelength will suffer from the variations. This section discusses the several causes of these variations and the techniques that we apply to cope with them.

Planarity of the Image Sensor

In order to start with a well controlled state, it is important that the image sensor is planarized before the filter structure is built up. This can be done using a deposition step, followed by a CMP (Chemical Mechanical Polishing) step to remove all topography. By doing this, the rest of the processing does not depend anymore on the exact BEOL arrangements. The thickness and the material of this planarization layer can to some extent be taken into account during the design of the filter structure. However, this layer is not a part of the active filter structure and does not have a large effect on the filter itself, as long as the correct material transition (important for the refractive index) is correctly taken into account. As the Fabry-Perot filter will be deposited on top of this planarization layer, variation in this layer will be not propagated up, as long as the variation is sufficiently slow across the wafer (e.g. no sharp edges). As CMP is able to generate a surface with across wafer flatness and variations at the nanometer scale, this requirement can be fulfilled.

Deposition Tolerances

A variation in deposited thicknesses in the components of the Fabry-Perot filters, in case the layers of the Bragg stack and the thickness of the cavity, will result in a mismatch between the designed filter and the produced filter. The effect of the variations on the thickness of the cavity is that: the thickness of all filters will be changed by more or less an equal amount, causing a shift of the spectral range to the right of the left of the theoretical design. This global shift in the selected wavelengths, either up or down, with respect to the designed filter location, can be compensated for by extending the range. By adding additional filter structures that cover a safety zone on either side of the desire spectral range, the tolerance on the deposition of the cavity can be covered. E.g. if the total variability on the deposited height of the cavity is maximally 20 nm, this can be related to the number of additional steps that has to be added. For a spectral different of e.g. 5 nm between, the cavity could be 10 nm higher or lower than in the design, leading to a modified range design including 2 additional steps, both for the smallest cavity length and for the biggest cavity length. This can be linked to the actual design by combining the needed number of spectral bands, the number of spatial lines under one band and the size of the sensor. This determines the free area on the sensor used as input to calculate the amount of extra bands and thus the maximum allowed variations on the deposition.

FIG. 12 shows a schematic representation of a hyperspectral imaging module for which the line filters are ordered from $\lambda_j$ to $\lambda_{j+k}$, e.g. from blue to red, and for which on both sides extra line filters have been added. These filters will not be used for the nominal point, when the design is produced without significant variation in the deposition of the cavity. However, when the initial cavity deposition is off, either side of the extra line filters will fall inside the intended range and will be functional, while more filters on the other side will be disabled. This range shift can easily be calibrated post-fabrication, by illuminating the full filter structure with some known wavelengths and by storing the location of the line filter with the highest response in a memory.

In addition to the wafer-wide deposition tolerance, designing an extended range, coupled to calibration, will also cover the expected inter-die variation. When needed, some additional steps can be added to cover this type of variation, or traditional binning, selecting certain devices for certain wavelength ranges. Intra-die variation cannot be handled by adding more steps and therefore the intra-die variation should be limited and should be less than the difference between two steps (e.g. 3 nm). If the intra-die variation exceeds this difference, the difference between two line filters with minimal nominal wavelength difference is no longer defined. Intra-die variations are smaller than variations inter-die variations (across the wafer). Variations across the wafer cause shifting of spectrum in one direction. Extended range is foreseen to cope with this shifting.

Etch Tolerances

Figure 13:
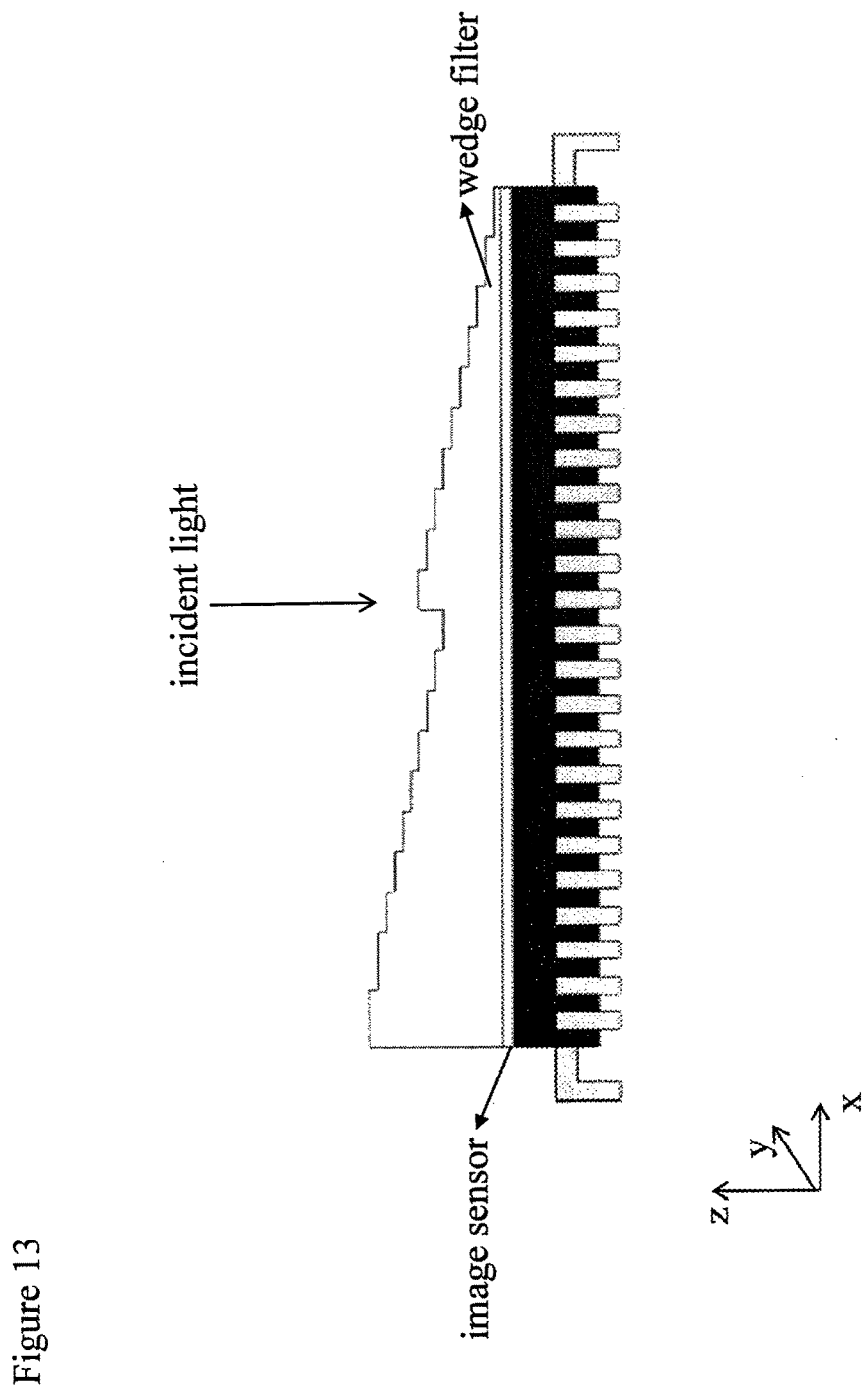
FIG. 13 shows an integrated imaging system having overlap of several bands taking care of etching tolerances.

After the initial deposition of the cavity material for the Fabry-Perot filter, different filter instances, e.g. for different line filters, can be made by etching this cavity material. The resulting Fabry-Perot filters will be defined by their respective different cavity heights. The exact wavelengths response of each individual line filter will depend on the target height and the process tolerances of the various etch steps by which the final height of the step is defined. To reduce the total number of etch steps that are required, techniques like binary masks or logarithmic masks can be used, by which only n etch steps are required to fabricate 2n different cavity heights. As was discussed above, the cumulative variation on the different etch steps that are required to define a certain target cavity length should be limited and less than the difference between two steps (e.g. 3 nm). However, some design tricks can be applied to stretch this requirement. If the optical filter is now designed that this tolerance is completely covered by introducing overlap, i.e. several parts of the mask contain the same wavelengths as shown in FIG. 13, the correct wavelengths can be allocated using a calibration and software processing.

In case the etch processes that are being used to define are non-directional processes, the sharp edges that form the transition between one line filter and the next one, can show rounding. In the presented embodiment, the width of each line filter can cover multiple columns of pixels. In case the post-production characterization shows significant distortions of the filter, due to corner rounding, the affected columns can be disabled or removed in software post-processing. This is a form of redundancy and it is part of a trade-off between the cost of process optimization and the performance of the produced device, in this case a reduction in the number of used columns of pixels. As indicated above section, a filter can be designed for a minimum number of spectral bands so that Shannon's sampling law is not broken. This can then be used to e.g. reduce the number of layers in the distributed Bragg stacks to reduce the Finesse and thus increase the FWHM of the Fabry-Perot filter. However, small variations on etching will cause the filters to shift a little bit to the right or the left. In both cases information from the spectrum will be missed. Spectral oversampling is a technique that uses the Fabry-Perot optical filter at its maximum FWHM to make it maximally spectral resolvable. The FWHM of these filters can be increased using system techniques. The additional spectral bands introduced by the spectral oversampling will overlap partially with the original ones, but they will make sure that all relevant information is acquired.

Non-monotonically increasing filters provide for spectral overlap in same wedge selected to give redundant information for most critical etch steps. Spectral oversampling takes care of shifting wavelengths in one die: FWHM designed to be smaller than needed for spectral resolution. The number of bands is calculated using the given FWHM to cover complete spectral range. System aspects, e.g. having smaller fo, will cause FWHM to increase, hence neighboring filters will start to overlap and form one filter for 1 spectral resolution. Due to oversampling, all spectral information will be sensed and can be extracted using calibration and standard image processing.

Alignment Tolerances

When using standard IC processing techniques, alignment of filter structures on top of rows/columns of pixels with dimension of several microns per pixels is well within the possibilities of the state of the art. Therefore, alignment at the top level is not very critical. As discussed in the previous paragraph, when a misalignment would occur, as a single line filter can cover multiple columns of pixels, the offending column can be disabled. Again, this is part of the same trade-off.

Design for Optical Fall-Off and Module Sensitivity

When designing the hyperspectral module, consisting of both the image sensor and the filter structure, cross-component optimizations can be done. As the proposed hyperspectral module is targeting low-cost and/or compact systems, lower quality optics can be expected. One effect which can be tackled in this context, is vignetting. Vignetting is a reduction of an image's brightness or saturation at the periphery compared to the image center. When this effect is coupled to the wavelength dependent efficiency of the Fabry-Perot filter and image sensor, both effects can be co-optimized in order to flatten the wavelength dependent behavior, instead of strengthening it.

As vignetting causes the light intensity to drop from the center towards the sides of the image, the effect for a scanning application can be split into two components. The effect of the intensity fall-off perpendicular to the scanning direction can be compensated for by the illumination, as is known to those skilled in the art, by the use of so-called illumination profiles. In the scan direction, a second opportunity exists, by exploiting the potential to reorder the line filters in such a way that the sensitivity/intensity difference is level out, instead of strengthened. Image sensors are designed for a certain wavelength range. E.g. CMOS imagers can in most cases be used in the 400 nm to 1000 nm range. However, the efficiency of the sensor is not the same over the complete range.

Figure 15A:
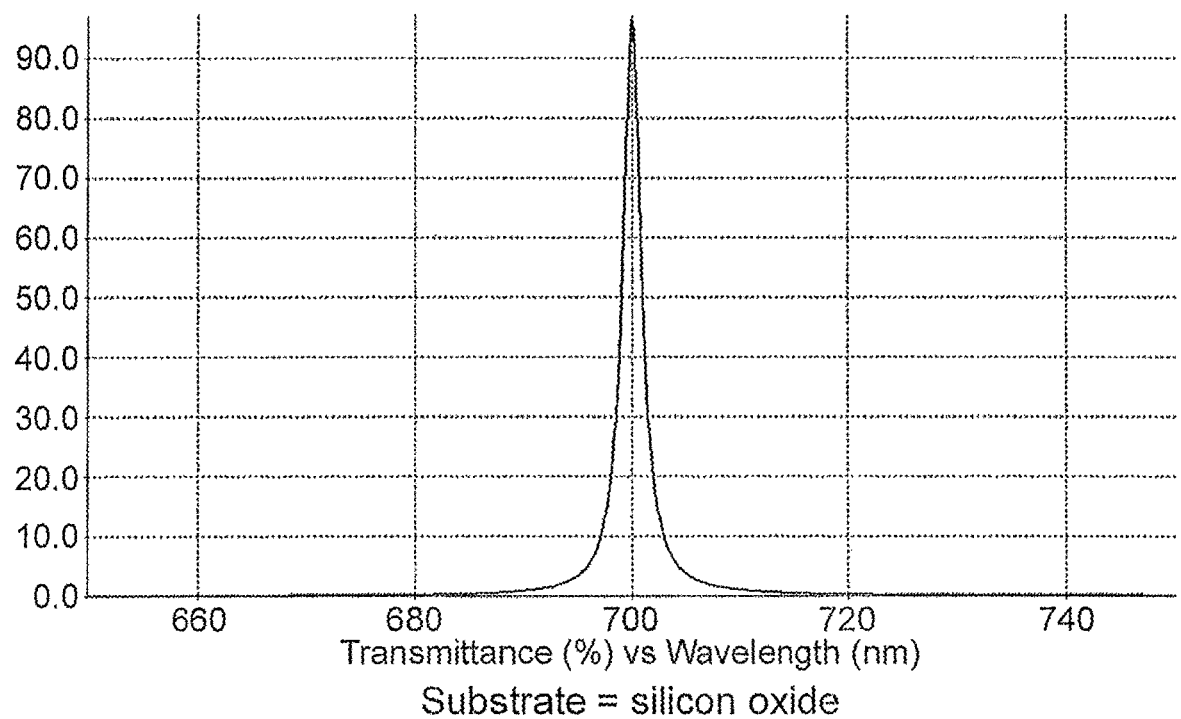
FIGS. 15a-c shows the effect of the image sensor on the performance of the filter.
Figure 15B:
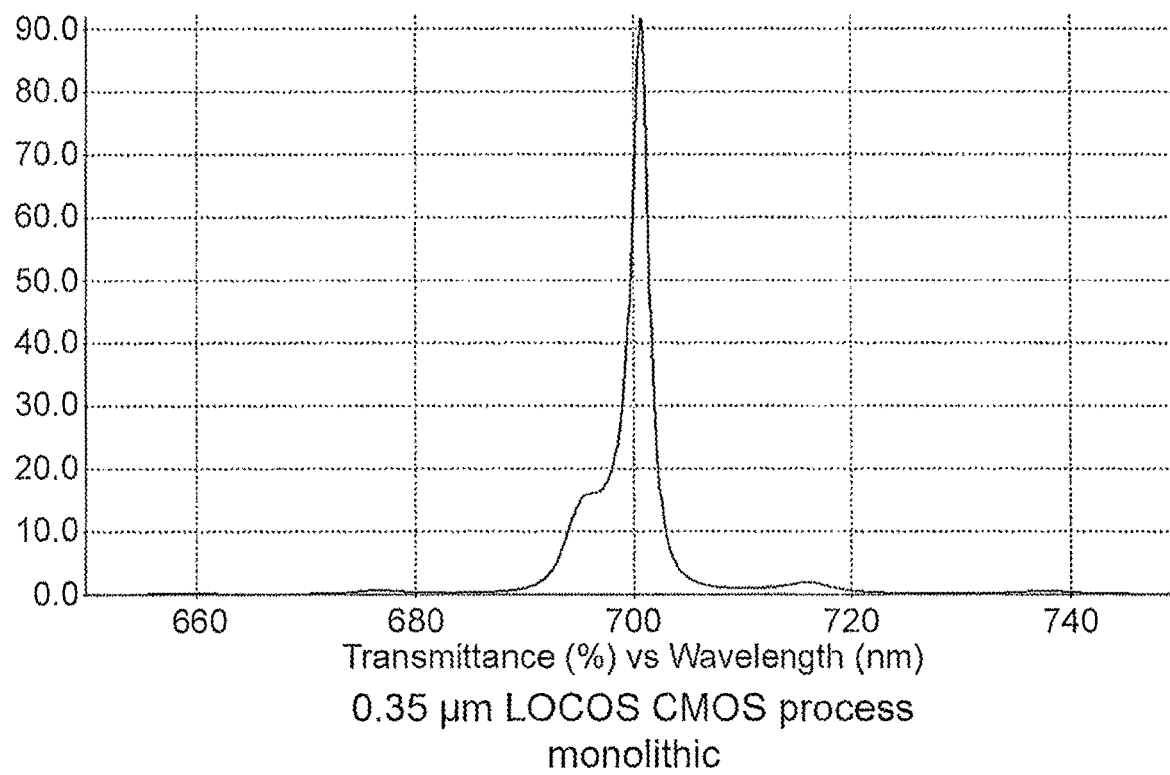
Figure 15C:
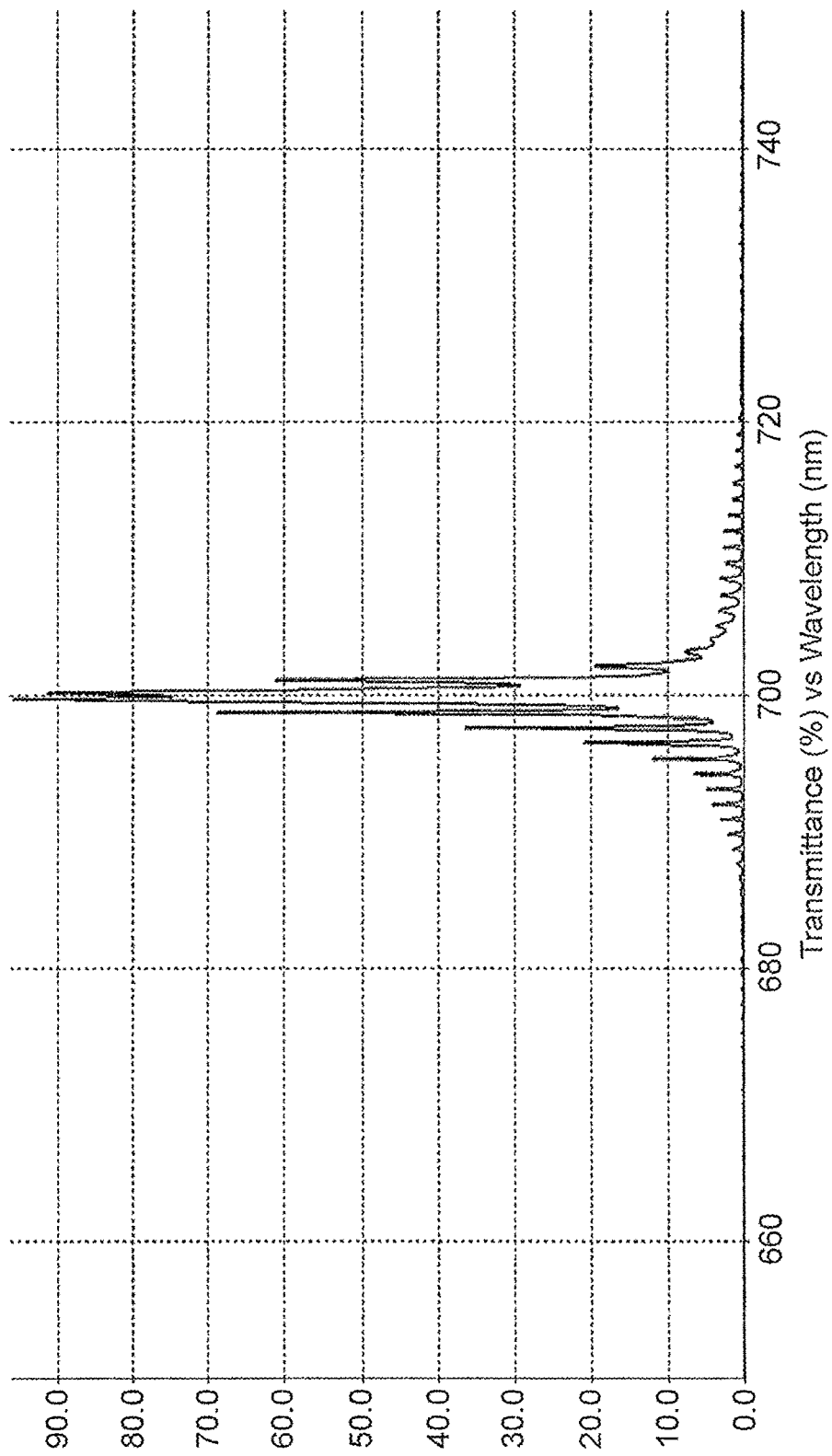
Figure 16:
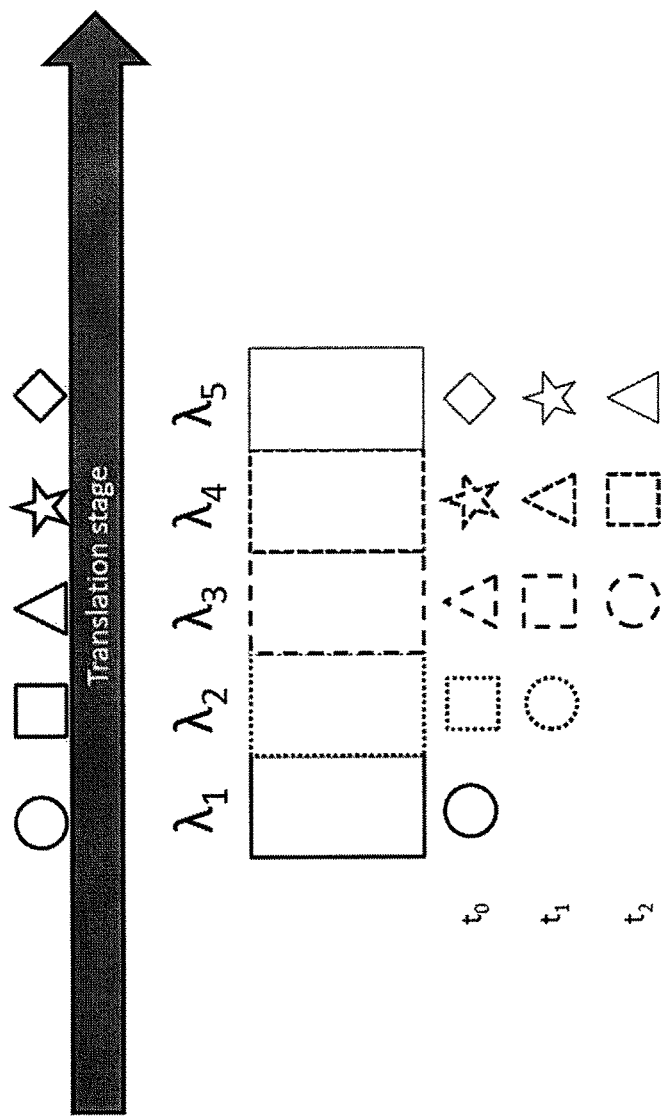
FIG. 16 shows the read-out of integrated imaging system.
Figure 17:
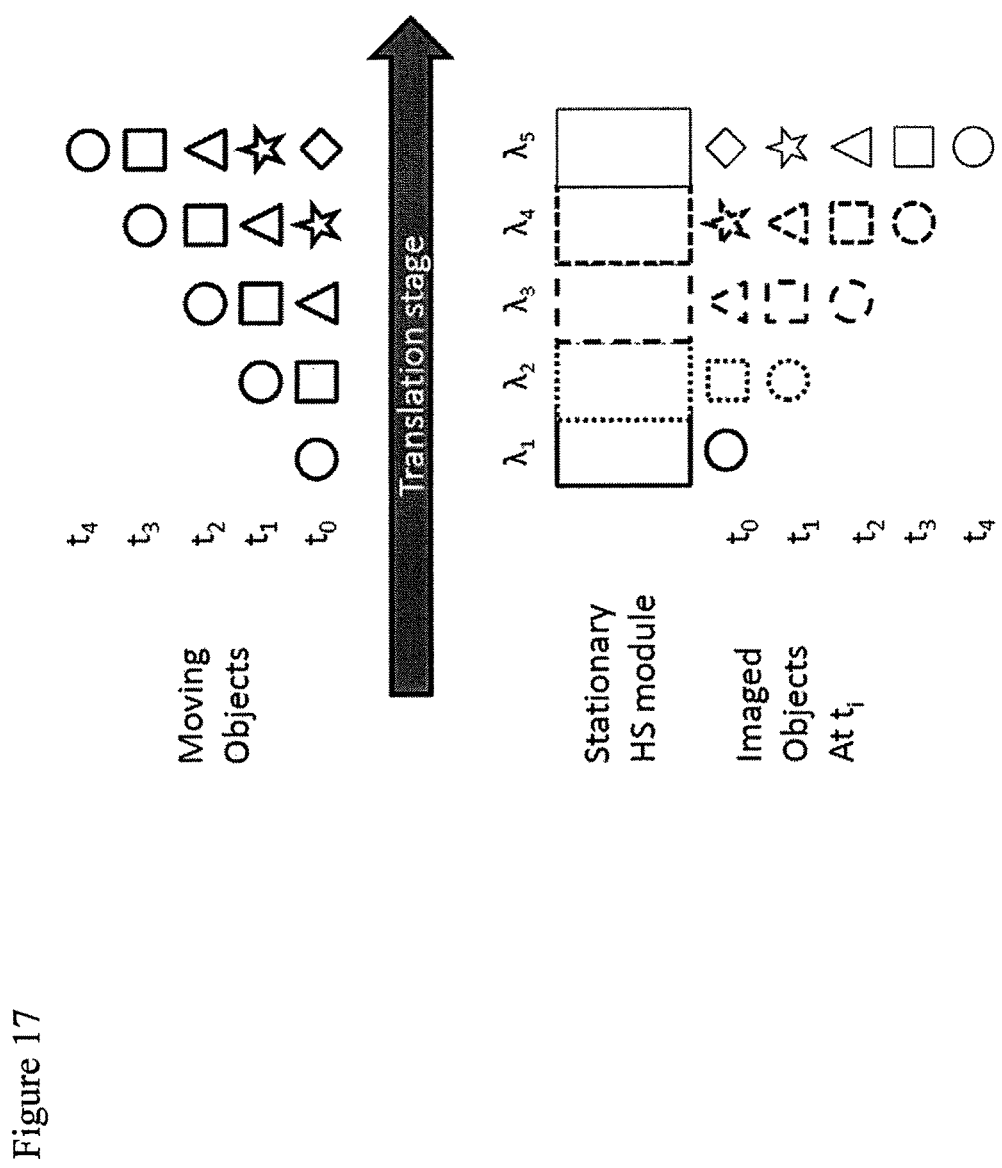
FIG. 17 shows the read-out of integrated imaging system having more than 1 line of sensors underneath a optical filter.

Both effects, vignetting and sensor sensitivity, affect the efficiency of the module for a certain arrangement of the line filters. When a straight forward ordering of the line filters, monotonously increasing in target wavelength, e.g. from 400 nm to 1000 nm in 10 nm increments, is chosen, the areas of the sensor (in the scan direction) that are affected most by the vignetting are the top and bottom most filter lines. For the straight forward ordering, these are the filter lines for the wavelengths that the sensor is least sensitive to. Hence, both effects add up and the hyperspectral module will have a suboptimal signal to noise ratio at the sides of the targeted wavelength range. In order to flatten the sensitivity and overcome this additive behavior of both effects, a reordering can be done that takes both effects into account. FIG. 15 show a schematic representation of a hyperspectral imaging module in which the line filters are no longer monotonously increasing, but for which the filters have been reordered. Filters that select wavelengths for which the sensor is the least sensitive are placed in the middle of the sensor, where no (or the least) vignetting will occur. Hence, both effects work in the opposite direction and the efficiency across the complete spectral range is flattened. This can be combined with illumination profiles, if needed, and when the application permits.

As has already been discussed in the foregoing paragraphs, one part of the design of the hyperspectral imaging module, is the distribution or ordering of the different line filters over the image sensor. In general, the design can be split into the following parts:

1. selection of the targeted wavelength ranges
2. selection of an image sensor for that range
3. selection of the targeted spectral sampling (and spectral resolution)
4. design of the different Fabry-Perot line filters
5. ordering of these Fabry-Perot filters over the image sensor The ordering of the filters, in principle, does not matter, as the different filtered wavelengths can be regrouped into a hyperspectral image in software after the scanning, whatever the ordering would be. A method to tolerate process technology variations is applied by making use of a filter as defined in above, the wavelength range being recovered after a post-production calibration step by reading out different rows or columns of pixels covered by a filter of the same height. However, still different types of ordering make sense, when taking into account other systems aspects, like production cost, sensitivity etc.

Figure 14:
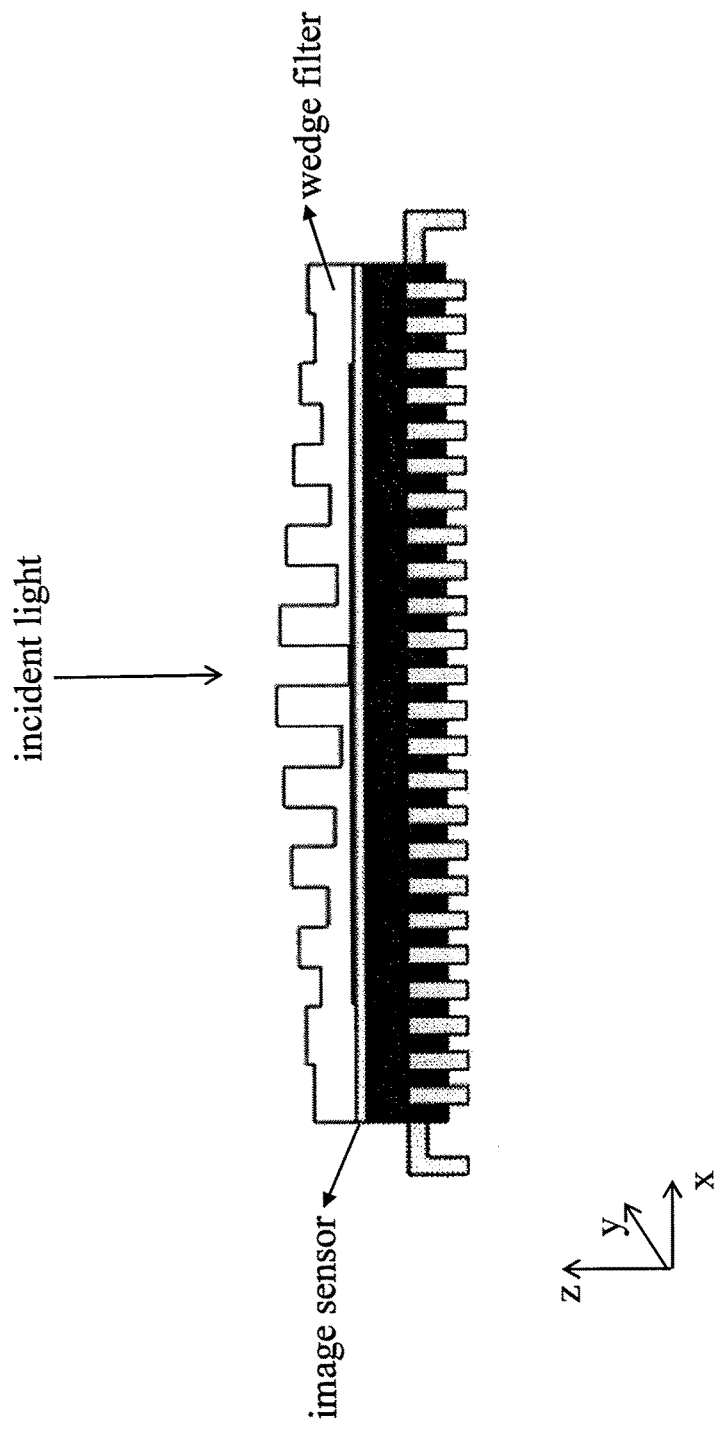
FIG. 14 shows an integrated imaging system whereby filters are re-ordered.

The first and most straight forward ordering, is called the wedge ordering, as its shape at the abstract level resembles a wedge or more accurately a staircase. In this ordering, all line filters are ordered according to a monotonously increasing filter wavelength. A graphical representation of the wedge ordering is shown in FIG. 12. One extension, as already discussed before covers a repetition of certain line filters in the staircase structure, in order to cover the tolerances in the processing. If certain critical etch steps would overetch, some sampling points in the hyperspectral image would be missing. In order to prevent this, a deliberate design modification is made, that intentionally creates a non-monotonously increasing staircase structure. At some critical points, the design will foresee a repetition of some line filter that can then later be removed in post processing but even when the processing tolerances would tend to over etch, no sample points would be missing. A graphical representation of this concept is shown in FIGS. 13 and 14, that clearly shows the overlapping range is the middle of the image sensor. As the ordering no longer monotonously increasing, technically this no longer considered to be a wedge.

System Aspects to Maximize Optical Throughput, Resulting in an Increased Speed:

Avoid the use of additional filters for order removal, use image processing for order removal;

Eliminate slit and collimator increases the optical throughput in this system, but FWGM increases and spectral resolution decreases: spectral oversampling allows this; and Spectral oversampling enables a more open aperture (replacing slit) for increasing optical throughput.

As discussed above, a Fabry-Perot Filter is sensitive to the angle of incidence of the light onto the filter: both the central wavelength as the FWHM depend on this incident angle. A special optical configuration can be used to minimize the impact of this dependency on the overall performance, e.g. when multiple filters are combined into a filter module. This section discusses this optical system and the trade-offs that impact the optical throughput, spectral resolution, full width half max (FWHM) of the filter, etc. A first system, discussed below, achieves the best spectral resolution and FWHM, but at the lowest optical throughput. Opening up the stop, by replacing the slit with a variable aperture, improves the optical throughput, but worsens the FWHM and spectral resolution. This trade-off is discussed.

Figure 18:
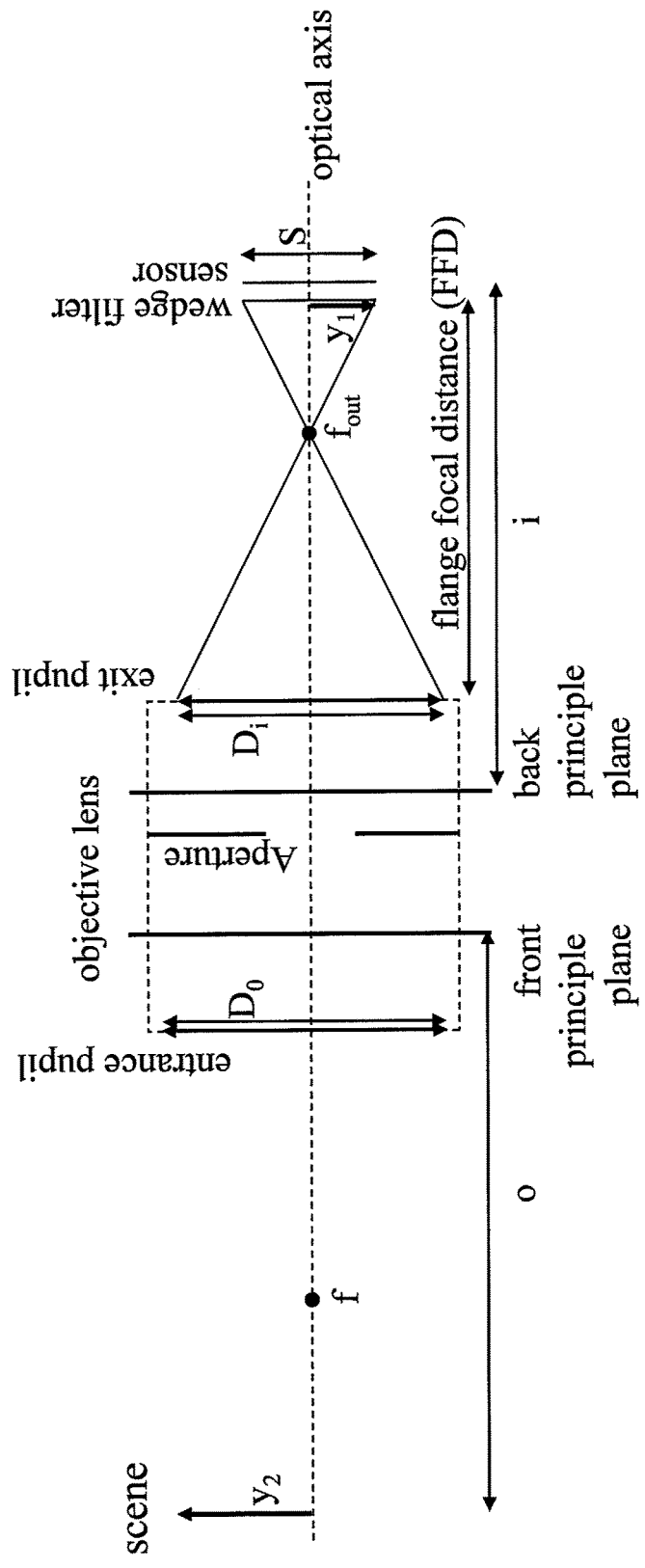
FIG. 18 shows an integrated imaging system combined with an objective lens into a system.

The integrated wedge filter can be used in different systems setups. Depending on the system integration, the resulting performance of the wedge filter, both for speed as for spectral resolution is different. One important aspect of the optical system, for which one example is shown in FIG. 18 is the size of the exit pupil.

The size of the exit pupil has a direct effect on the size of the variation in the angle of incidence of the light onto the Fabry-Perot filter that is formed by each step of the wedge. For a pixel p, below a given step of the integrated wedge filter at a distance x from the optical axis, the angles between the incident ray parallel to the optical axis and the top and bottom of the exit pupil are called $\alpha$ and $\beta$ respectively.

As can be seen from FIG. 4 the size of $\alpha$ and $\beta$ depend on the size of the exit pupil. Since the selected wavelength of the Fabry-Pérot filter depends on this incident angle, this results in various wavelengths being selected by each step of the integrated wedge filter. This relation is described by the following three equations.

$$\alpha = \operatorname{atan}\left(\frac{D_i/2 - x}{i}\right) \text{ and } \beta = \operatorname{atan}\left(\frac{D_i/2 + x}{i}\right) \quad \text{Eq (8)}$$

$$\theta = \operatorname{asin}\left(\frac{\sin(\alpha)}{n_{cavity}}\right) \text{ and } \theta_2 = \operatorname{asin}\left(\frac{\sin(\beta)}{n_{cavity}}\right)$$

$\lambda_\alpha = \lambda \cdot \operatorname{cis}(\theta_1)$ and $\lambda_\beta = \lambda \cdot \cos(\theta_2)$ At the systems level, the direction of the incident light can be controlled by the use of a collimator and/or a telecentric lens. The following paragraphs describe different system integrations, both with and without collimator. Depending on the application, both have a different improvement over the current state of the art solutions.

Collimated (can be Used for Higher Spectral Resolution than Grating Based Systems)

This subsection describes the possible optical system setups to use the proposed filter module as a pure line scanning hyperspectral camera. In this setup, all wavelengths for a single line are collected at the same time. As illustrated in FIG. 1 the hyperspectral image cube is then constructed scanning the scene line per line. An objective lens for the image forming is used and a slit for selecting a single line from this image. The collimator is used to control (minimize) the angle of incidence of the light rays onto the optical filter or the imager. At the output of the collimator the light rays are nearly parallel. Because of the well selected location of the slit on the optical axis and the very small size of the slit, these light rays are parallel to the optical axis. The collimator is a plano-convex lens and is not a rotational symmetric lens. Its collimating function is restricted to the direction of the shown cross-section. In the perpendicular direction, the direction of the slit, there is no collimating effect. As a result, the image line selected by the slit is duplicated over the complete sensor with an angle of incidence perpendicular to the optical filter. Consequently, the light energy in that line is also spread over the complete sensor. Light rays that originate on image lines above or under the optical axis (e.g. by widening the slit) will also be parallel after collimation, but will not be parallel with the optical axis. The spectral resolution for a system using a collimator will therefore be independent of the f/# of the objective lens, but will be dependent on the slit size.

Figure 19:
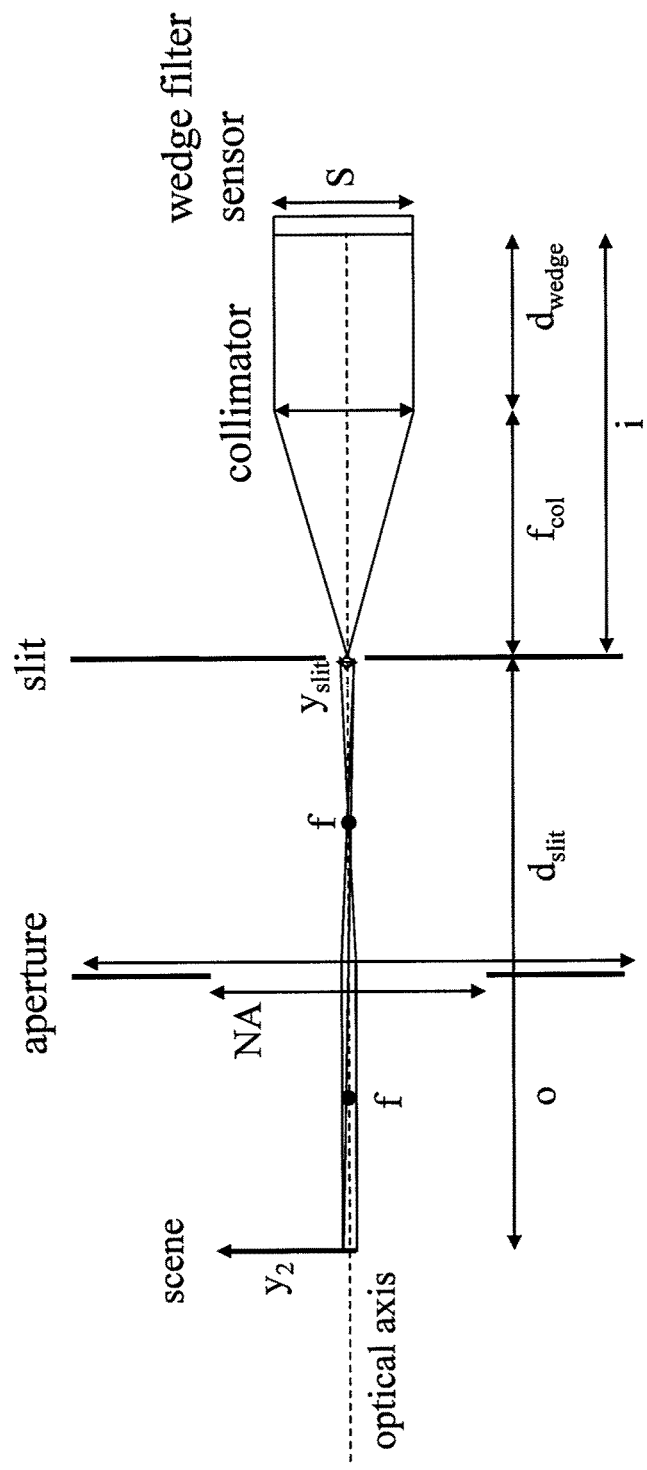
FIG. 19 shows an integrated imaging system combined with a collimator.
Figure 20:
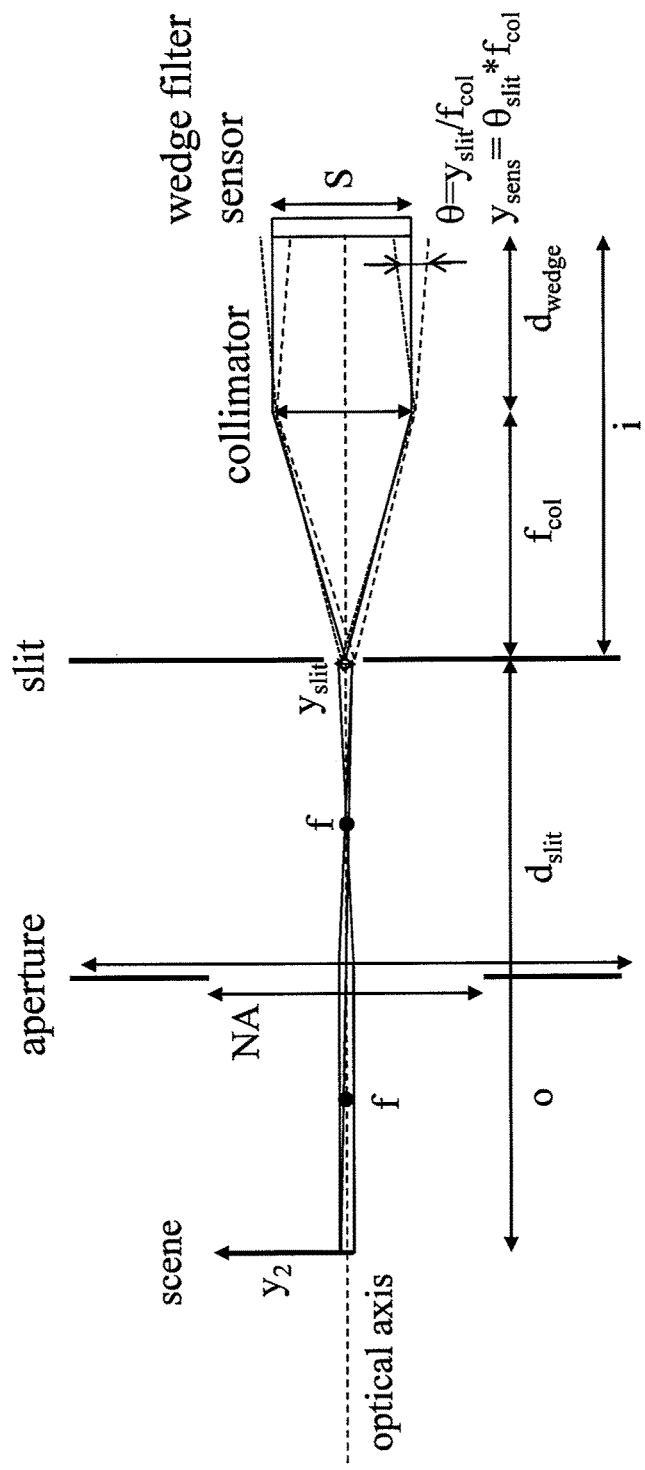
FIG. 20 shows the effect of collimation on spectral resolution.
Figure 30:
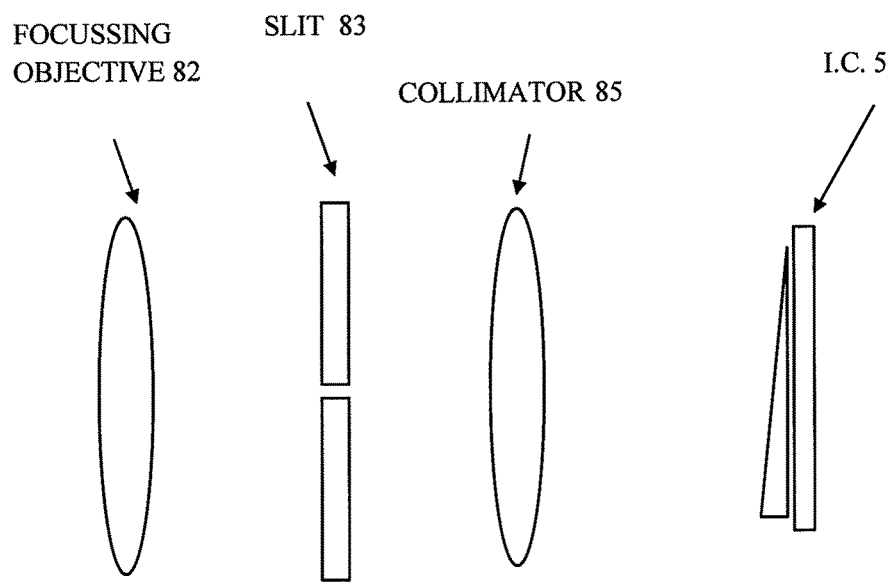
FIG. 30 shows a side view of optical parts of an imaging system having a collimated system with a wedge filter array.

The first set-up, as shown in FIG. 19 and FIG. 30 is a line-scanner consisting of an objective lens 82, slit 83, collimator 85 and integrated circuit 5 having the wedge filter on top of a standard image sensor. As a result of the use of the collimator, the angle of incidence of the light on top of the wedge filter is controlled well and this results in a good spectral resolution. However, due to the use of a slit, the amount of light (and hence the amount of energy) that enters the system is heavily reduced. This results in larger integration times for the sensor and in an overall reduced speed. FIG. 19 details the collimated system. The scene, at distance 0, is imaged by the objective onto the slit, at distance dslit. The focal points of the objective are indicated by two points f. The Numerical Aperture NA is related to the amount of light that is passed by the objective lens. The light that passes through the slit falls onto the collimator, at distance fcol. The collimated light is then projected onto the filter and sensor, at distance dwedge. The effect of the slit and collimation on the spectral resolution is shown in FIG. 20, where the angle $\theta$ is proportional to the height of the slit Yslit and represents the deviation of the selected wavelength for $\alpha$ and $\beta$ with respect to the nominal wavelength.

Figure 21:
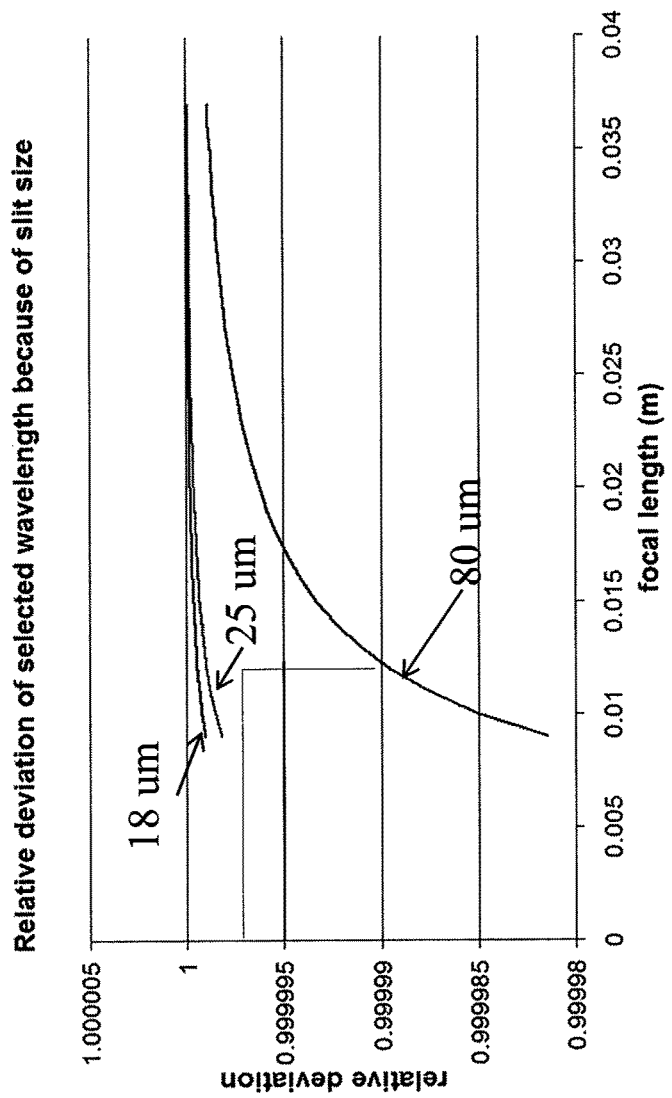
FIG. 21 shows the relation between slit size and spectral resolution of an integrated imaging system.

From FIG. 21 it can be seen that the deviation of $\lambda_\alpha$ and $\lambda_\beta$ with respect to the nominal wavelength result in a relative deviation that is related to the slit size and the object distance. For a slit size of 80 µm, the relative deviation is still below one pro mille for a collimator with a focal length of over 10 mm. For smaller slit sizes and larger object distances, this deviation is even smaller. As a result, very good spectral resolutions can be achieved with this system.

The achievable spectral resolution is in this system better than for a grating based system, as the limiting factor in grating based systems depends on the dispersion per pixel and the higher sensitivity of the grating equation (equation 10) to changes of the incident angle compared to the Fabry-Perot equation (equation 9). For the angle of incidence of interest ($\theta=0$), the sensitivity of the grating equation is maximal, while for the Fabry-Perot equation this sensitivity is minimal.

$$\begin{cases} m\lambda = 2nl\cos\theta \\ \dfrac{d\lambda}{d\theta} = 2nl\sin\theta \\ \theta = 0 \Rightarrow \dfrac{d\lambda}{d\theta} = 0 \end{cases} \quad (9)$$

$$\begin{cases} m\lambda = 2nl\cos\theta \\ \dfrac{d\lambda}{d\theta} = 2nl\sin\theta \\ \theta = 0 \Rightarrow \dfrac{d\lambda}{d\theta} = 0 \end{cases} \quad (10)$$

In addition, the width of the spectral band for a grating based system also depends on its dispersion per mm, which depends on the pitch p. Because of this continuous dispersion, a complete spectral band is projected on a single pixel. The larger the area of the pixel, the faster the sensor, but the higher the width of the spectral band will be. The width of the spectral bands of the proposed wedge filter is independent of these pixel sizes and only depends on the material parameters.

Due to the use of a slit, however, the amount of light that enters the system is heavily reduced. This is expressed through the optical throughput, which is a geometric measure of how much light is allowed to enter the optical system. Because slits have a significantly reduced area, the optical throughput of these systems is also drastically reduced, limiting the amount of light that can enter in the camera and thus limiting the speed of the camera.

Un-Collimated (can be Used for Faster Systems than Grating Based Systems)

Figure 31:
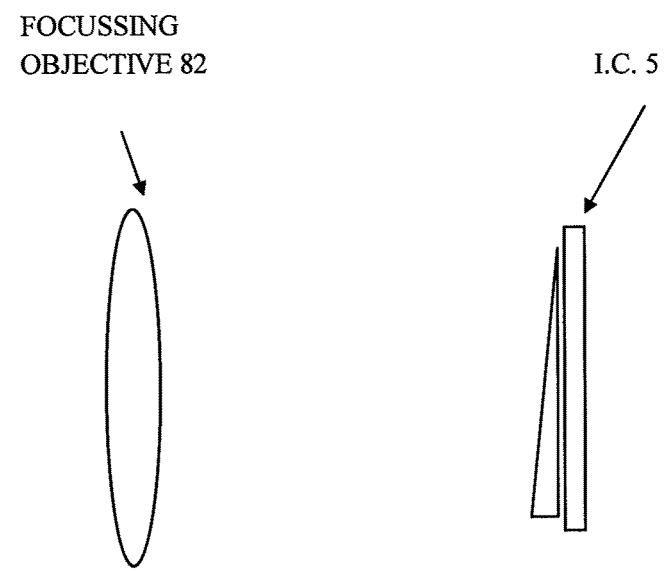
FIG. 31 shows a view of an uncollimated system with an integrated circuit having a wedge filter array.

An alternative system setup does not have a slit and projects a complete image frame onto the sensor. As shown in FIG. 31, there is an objective lens 82 and the integrated circuit 5. The sensed image will therefore represent all the spatial information in the object, but as the different lines on the sensor are sensitive to different spectral bands, the different lines in the image will also contain information from different spectral bands. Collecting all the spectral bands for a line is done by scanning the line over the sensor and subsequently combining all spectral information corresponding to the same spatial line from different frames into one hyperspectral image cube. E.g. assume an object for which a first line is projected on the first line of the sensor, sensitive to one specific spectral band b1. The first image line will therefore only contain information of this band b1. Next, the line of the object moves to the second line on the sensor, which is sensitive to another spectral band b2. The second band for that line will then be collected at the same time as the first band is collected for the next line on the object. This procedure is then repeated until the complete object is scanned in all wavelength bands.

The second system integration option uses no slit or collimator and the integrated wedge filter with sensor is combined with an objective lens into a system. By eliminating the slit and collimator, the total system cost is reduced and the amount of light that enters the system is increased, which can lead to a faster camera. However, the angle of incidence of the light onto the different filter steps of the integrated wedge filter is less controlled, which results in a reduced spectral resolution if the lens system is not carefully designed.

Figure 22A:
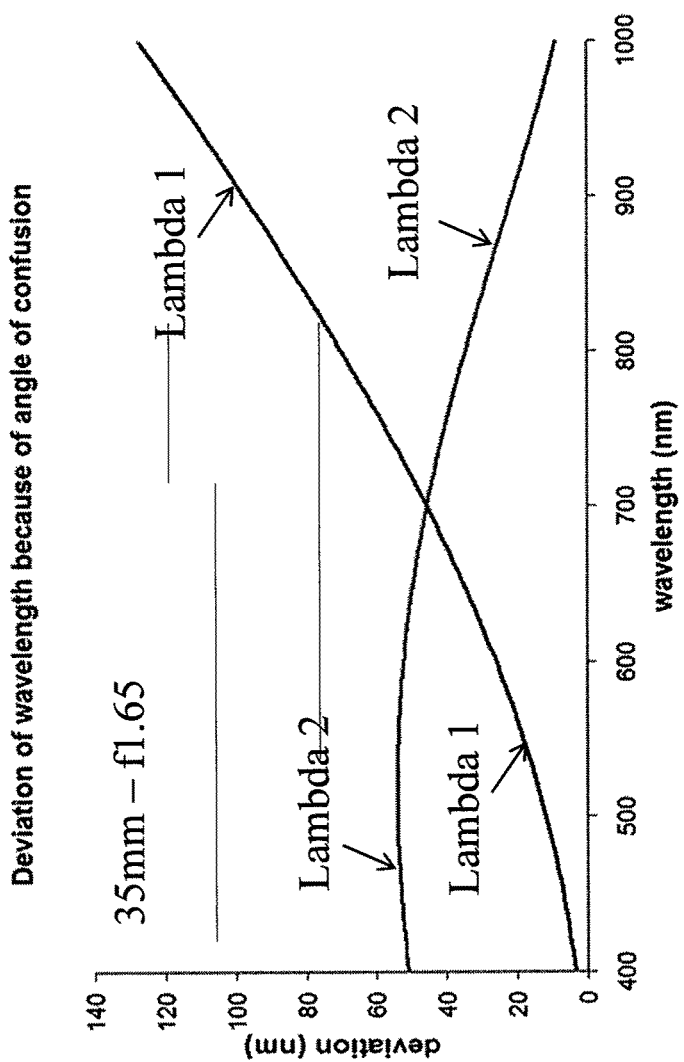
FIGS. 22a-b shows the effect of aperture size on spectral resolution of integrated imaging system.
Figure 22B:
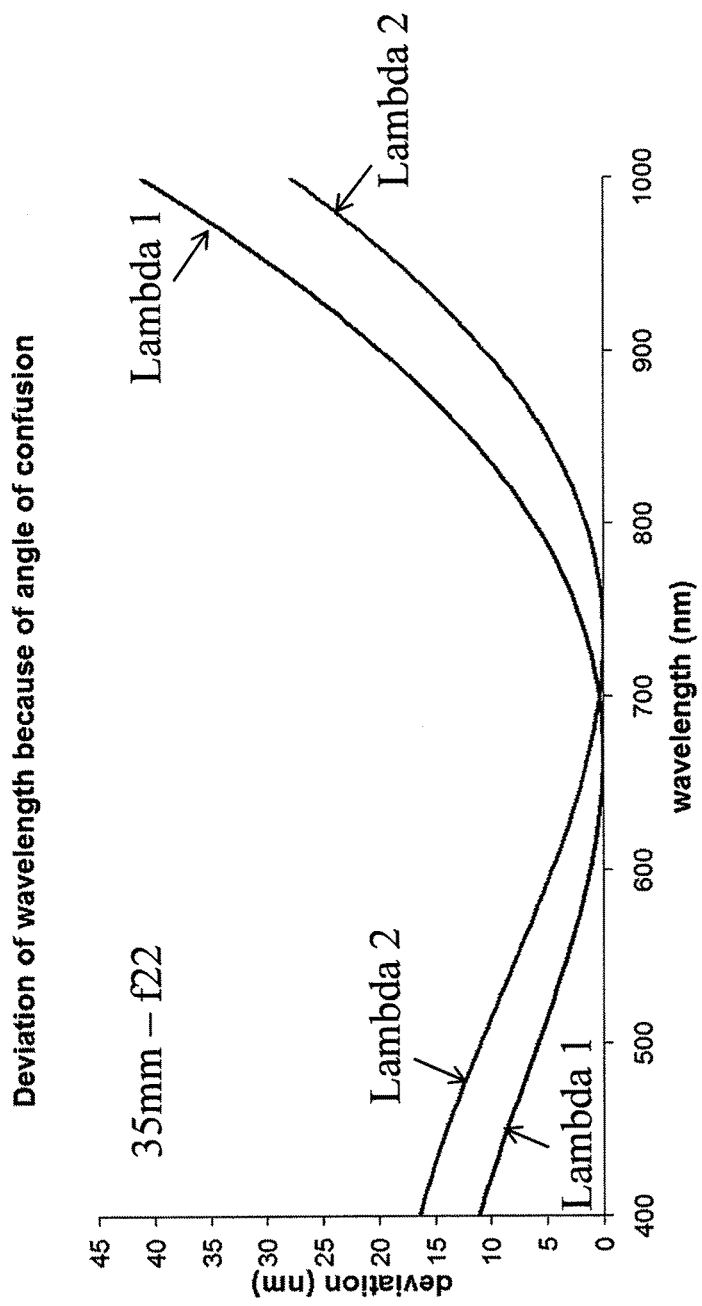

As was shown in FIG. 4, the angle of incidence depends heavily on the exit pupil of the objective and hence on the aperture. FIG. 22 illustrates the effect of the objective aperture on the worst case range of wavelengths that are being selected by the steps of the wedge filter (with Lambda 1=α and Lambda 2=β). In FIG. 22a a large aperture (f1.65), which corresponds to a fast system, results in a spectral resolution that will be no better than 60 nm from 400 to 800 nm and even less between 800 and 1000 nm. However, by reducing the aperture (f22), as shown in FIG. 22b the spectral resolution can be increased and a resolution of about 15 nm can be reached across most of the range of interest. However, this again results in a loss of light and hence a slower system.

Careful lens design is thus needed to maximize the numerical aperture (optical throughput) and optimize the spectral resolution. One example (but not limited to) of such a lens is a telecentric lens, which is a lens with the chief rays in parallel with the optical axis. These lenses significantly limit the angle of incidence of the light and are perfect candidates as objective lenses for these cameras.

Figure 23:
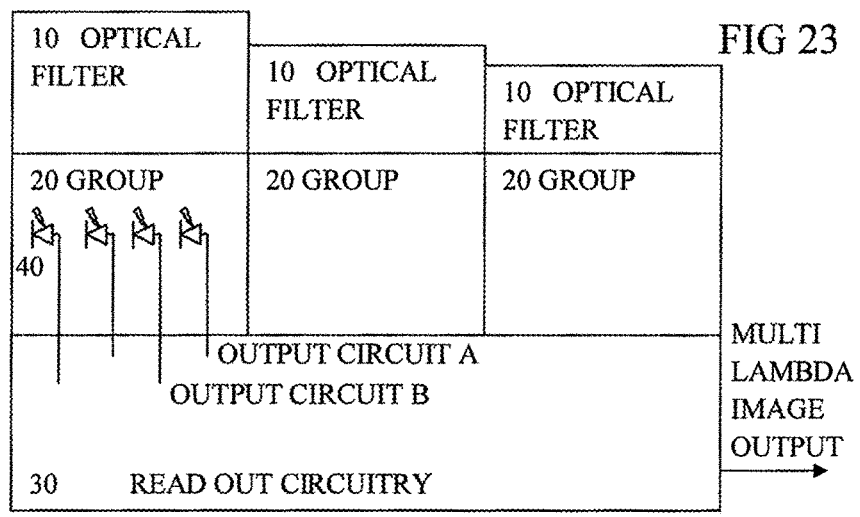
FIGS. 23, 24, 27 and 28 show schematic views of integrated circuits according to one embodiment.

FIG. 23, Integrated Circuit According to an Embodiment Having Parallel Read Out

FIG. 23 shows an integrated circuit having optical sensors 40 in groups 20 underneath optical filters 10 of differing thicknesses. Read out circuitry 30 has output circuits A and B for each of the groups, (though output circuits are shown only for one group for the sake of clarity) so that an image having various spectral bands can be output (multi lambda image). For each group, some of the optical sensors are coupled to output circuit A and others to output circuit B. Of course, there may be many more. In some cases, these may be one output circuit per sensor, to provide more complete parallelism in the read out. This enables the optical sensors for one group to be read out in parallel and thus read out more quickly, or a larger group to be read out in a given time. The group can be a line, or any other shape. The parallel outputs can be output in parallel, or can be multiplexed before leaving the integrated circuit. The optical sensors for each output circuit can be interleaved with those of other output circuits, or be in concatenated sections of a line for example.

Figure 24:
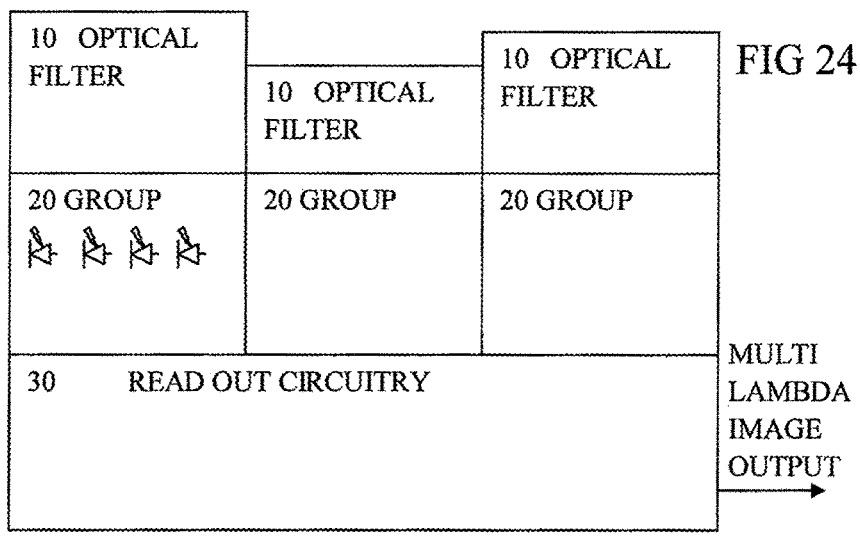
Figure 26:

FIGS. 24-26, Embodiments Having Non Monotonic Thicknesses

FIG. 24 shows an integrated circuit having optical sensors 40 in groups 20 underneath optical filters 10 of differing thicknesses. Read out circuitry 30 is provided so that an image having various spectral bands can be output (multi lambda image). In this case the thicknesses vary so as to increase and decrease across the array, rather than varying monotonically.

FIGS. 25 and 26 show examples of other profiles of thickness across the array of optical filters. FIG. 9 shows a peak near the middle of the array. FIG. 10 shows a saw tooth arrangement (steps too small to be resolved in this view) with clusters of optical filters having overlapping spectral bands. This gives some redundancy which can be exploited in later image processing to enable more tolerance of imprecision in the manufacture of the optical filters.

Figure 27:
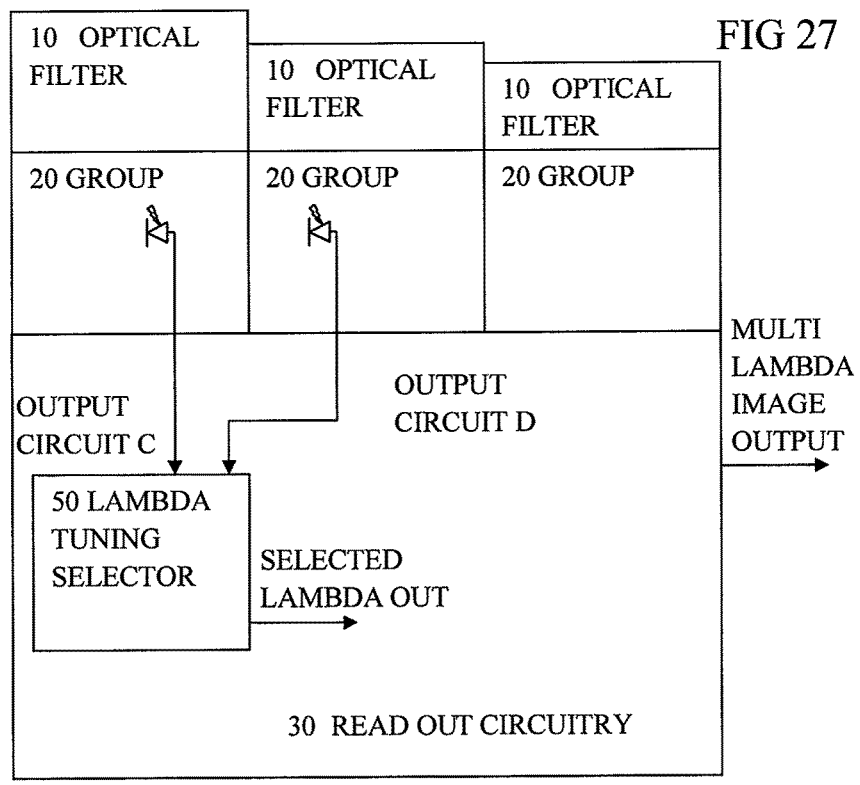
Figure 28:
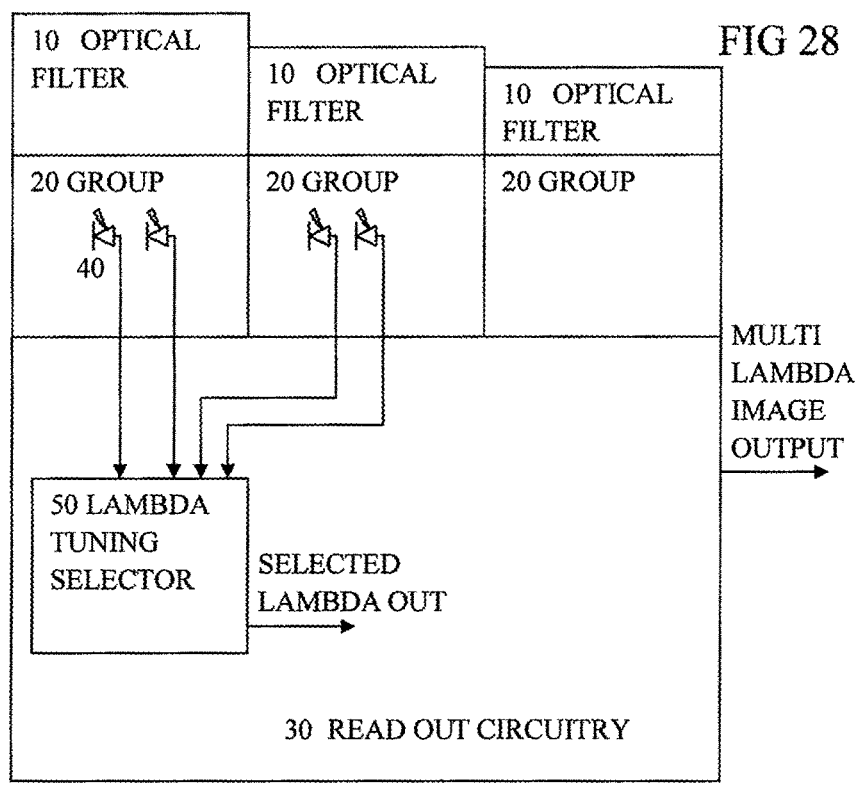
Figure 29:
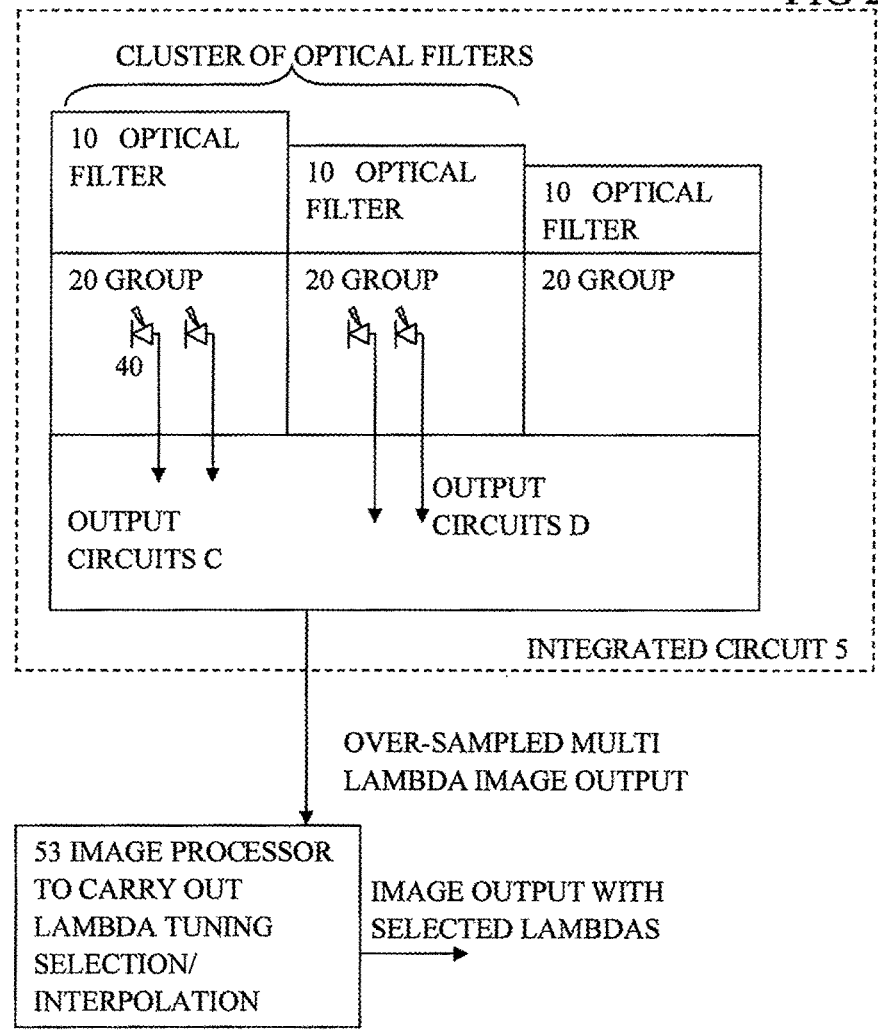
FIG. 29 shows a schematic view of an imaging system according to an embodiment.

FIGS. 27-29, Embodiments Having Lambda Selection.

FIG. 27 shows an integrated circuit according to another embodiment having optical sensors 40 in groups 20 underneath optical filters 10 of differing thicknesses. Read out circuitry 30 has output circuits C and D for different optical filters (in a cluster of two or more of such filters), and a lambda selector 50 arranged to select either of these output circuits or interpolate between them, so that an image having various spectral bands can be output (multi lambda image). This can enable spectral sampling or spectral interpolation, which again can enable greater tolerance of errors in thickness of the optical filters. If the clusters effectively overlap with each other so that some optical filters belong to two clusters then the wavelength selectors can be controlled to effectively shift the wavelength without necessarily subsampling.

FIG. 28 is similar to FIG. 27, but with multiple output circuits for each group, which can be arranged to read out in parallel and feed parallel or multiplexed signals to the lambda selector to improve read out speeds for example.

FIG. 29 is similar to FIG. 27 or 28, but with the lambda selector now implemented off chip, as a function of an image processor 53. This can enable the integrated circuit to be simpler, but may involve higher data transmission rates off the chip.

The integrated circuit can be approximately 1 cm square for example. It can have a standard array of optical sensors (FSI) on one surface of which is formed a bottom semi transparent mirror of Al, after a planarization and/or anti reflective coating has been applied. The transparent layer in the wedge shape can be formed of $SiO^2$. As discussed above, the wedge need not have a monotonic change in thickness across the array. A top semi transparent mirror can be formed of a layer of Al. Each of the manufacturing steps can be implemented using various known techniques.

Summary of Some Additional Features:

The integrated circuit can have each of the optical filters having a layout as a strip across the integrated circuit, the group of sensors for a respective one of the optical filters having a layout extending as a corresponding strip. The group of sensors can have a layout configured as two or more lines of sensors corresponding to the layout of the strip, each of the lines of sensors being coupled to a different one of the output circuits.

The read out circuitry can have a wavelength selector for selecting between or combining (such as by interpolating between, or other combination of) read out signals of corresponding pixels of different optical filters to tune the output to correspond to a particular wavelength. The locations of the optical filters can be arranged so as to have optical filters for wavelengths for which the optical sensors are less sensitive located at locations where the incident illumination will have lower intensity. Typically this is near the centre and away from edges of the sensor array. The locations can be arranged to provide a cluster of adjacent optical filters having different thicknesses to enable detection over a first spectral band, and to provide a neighbouring cluster having different thicknesses to enable detection over a second spectral band such that the first and second spectral bands overlap.

At least some of the sensors can be arranged in groups each receiving light from a corresponding one of the optical filters, and the read out circuitry can comprise at least one output circuit coupled to the sensors of a respective one of the groups, with a wavelength selector for selecting between or interpolating between read out signals of different groups corresponding to different ones of the optical filters, to provide an output for those groups tuned to correspond to a particular optical wavelength.

The locations can be arranged to provide a given one of the optical filters with neighbouring strips which are both thicker or both thinner, to provide a valley or ridge structure respectively. (Valleys/ridges can be local or across part or all of array. Non-monotonic can also be a randomized ordering, such that valleys/ridges are too short to appear any more.) The thicknesses of the optical filters can be configured to compensate for differing angle of incidence of light at different positions across the array of optical filters. In the example of a longitudinal strip filter, the angle of incidence is likely to be greater near the extremities and so the thickness should be less, so that the path length is constant.

The locations can be arranged to provide a cluster of adjacent optical filters having different thicknesses and the read out circuitry having a wavelength selector for selecting between or interpolating between read out signals of corresponding pixels of different optical filters of the cluster to tune the output to correspond to a particular wavelength.

The wavelength selector can be arranged to output signals representing proportionately fewer wavelengths than the quantity of different optical filters provided on the array of optical filters, so as to provide a proportionate spectral subsampling.

The wavelength selector can be arranged to output signals representing a number of wavelengths similar to a quantity of different optical filters provided on the array of optical filters, so as to provide a spectral shift.

The amount of spectral shift can be varied according to location in the array of optical filters to compensate for manufacturing variations in optical filter thickness at different locations.

An imaging system can have the integrated circuit and an external image processing part coupled to receive the pixel values representing the image, and to output an image processed version of the received image. The imaging system can be arranged to generate and store an image cube of an object, by relative motion of the integrated circuit and the object being imaged, the image cube having x and y spatial dimensions, and a spectral dimension. The imaging system can be arranged to apply a lambda selection or interpolation image processing function, to subsample the image cube in the spectral dimension or to shift the image cube in the spectral dimension. The variation according to location can be suitable to compensate for any one or more of the following: manufacturing variations in optical filter thickness at different locations, distortions owing to variation in angle of incidence of an optical path through the optical filter, higher order removal and distortions from other optical components.

The imaging system can have any one or more of: an objective lens a slit and a collimator, in an optical path leading to the array of optical filters. At least some of the optical filters can have a thickness suitable to distinguish higher order interference, and the image processor can be arranged to compensate for higher order interference effects in the rest of the image representation according to an amount of higher order interference distinguished by those optical filters.

Some embodiments have an optical filter array with a stepped-like structure post-processed on top of an image sensor array, the filter being positioned in direct contact with the image sensor array. The filter array in some cases has every step of the filter aligned with a single row or column of pixels of the image sensor array. In some cases each row or column of pixels is covered with a Fabry Pérot filter of different height. In some cases the changes in thickness are monotonic, and in other cases they are non monotonic, to create ridges or valleys, across the array. In other cases, a thickness of each step is tuned to a filtered spectral band.

Methods for manufacturing monotonic or non monotonic changes in the thickness of the filter array can include using a binary or logarithmic patterning technique.

Examples of a complete HSI system can include an image processor after the optical sensor array, and optical parts before it.

A hyper spectral camera system can consist of an optical filter array post-processed on an image sensor array as defined in the above, the system further comprising an objective lens and/or slit and/or a collimator.

An effect of the non monotonic variation of thicknesses is to reorganise the relationship between frequency and the differing sensitivities of parts of the image sensor arrays (place high or low frequency in the middle instead of on the edge of the sensor). Also it can reduce the sensitivity of the filters to processing variations and hence can increase yield. It can enable several differing wavelengths clustered about a one wavelength to be received by different ones of the sensors and then the wavelength to be selected or processed later that is best suited. Non monotonic variation enables grouping of some spectral bands in a cluster (range) and to position them arbitrarily on the sensor array. This allows many things, like reordering for tolerances, compensating for fall-off, and so on. Monotonic wedges can do some of this but will however never be able to cope with tolerances because of etching, whether they are larger or smaller than the deposition tolerances doesn't matter. The non monotonic variation enables the intra cluster variation to be greater than the inter cluster variation. In another example an increase in width of 1 or more steps can be provided for the most important bands for the particular application. Another alternative is to adapt the ordering of the different steps to match areas of maximum sensitivity of the optical parts to less sensitive areas of the sensor. So the middle of the sensor array can be used for the most important bands for the application, by making filter array have the appropriate thickness in the middle for example.

An effect of selection according to calibration input is that the calibration input can compensate for process variations either intra-die or inter-die variations across a wafer of many dies, or even inter wafer variations, if there are enough sensors and optical filters to effectively oversample the spectrum, or to have extended range so that selector selects the best suited filters that most closely match a desired set of wavelength values.

Typical System Tradeoffs:

For line scanning imagers, a good spectral resolution is typically obtained through the combined use of the slit and the collimating lens Eliminating these parts can cause a decreased spectral resolution. Indeed, the slit and collimating lens control the angle of incidence of the light on the sensor, which in many wavelength selectors is an important parameter. The spectral resolution is known to vary as a function of the angle of incidence on the sensor. However, the elimination of the slit increases the optical throughput and thus increases the speed of the system;

The integration of the wavelength selection component on top of the imager not only reduces the amount of stray light (increasing the speed), but also enables a reduction in the cost of the system; and The co-design of the wavelength selection component with low-level image processing can enable larger tolerances on the wavelength selector.

Furthermore, by providing application dependent image processing, a drawback with current hyperspectral imagers that are typically research instruments, with image processing delivered as a research instrument in packages that are typically only useable by experienced and trained people on high performance infrastructure, can be overcome. Real-time hyperspectral image processing can enable use of such hyperspectral technology in industrial machine vision and medical imaging amongst others.

Processing Hardware:

Some of the method steps discussed above for image processing for example, may be implemented by logic in the form of hardware or, for example, in software using a processing engine such as a microprocessor or a programmable logic device (PLD's) such as a PLA (programmable logic array), PAL (programmable array logic), FPGA (field programmable gate array).

An example of a circuit with an embedded processor may be constructed as a VLSI chip around an embedded microprocessor which may be synthesized onto a single chip with the other components. Alternatively other suitable processors may be used and these need not be embedded, e.g. a Pentium processor as supplied by Intel Corp. USA. A zero wait state SRAM memory may be provided on-chip as well as a cache memory for example. Typically I/O (input/output) interfaces are provided for accessing external storage e.g. via data networks. FIFO buffers may be used to decouple the processor from data transfer through these interfaces. The interface can provide network connections, i.e. suitable ports and network addresses, e.g. the interfaces may be in the form of network cards.

Software:

Software programs may be stored in an internal ROM (read only memory) and/or on any other non-volatile memory, e.g. they may be stored in an external memory. Access to an external memory may be provided by conventional hardware which can include an external bus interface if needed, with address, data and control busses. Features of the method and apparatus of various embodiments may be implemented as software to run on a processor. In particular image processing in accordance with certain embodiments may be implemented by suitable programming of the processor. The methods and procedures described above may be written as computer programs in a suitable computer language such as C and then compiled for the specific processor in the embedded design. For example, the software may be written in C and then compiled using a known compiler and known assembler. The software has code, which when executed on a processing engine provides the methods and image processor for certain embodiments. The software programs may be stored on any suitable machine readable medium such as magnetic disks, diskettes, solid state memory, tape memory, optical disks such as CD-ROM or DVD-ROM, etc. Other variations can be envisaged within the claims.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

What is claimed is:

1. A method for calibrating an image sensor, comprising:
   illuminating at least a portion of the image sensor with an input light spectrum, wherein the input light spectrum includes light of known wavelength and intensity, wherein the image sensor includes a plurality of optical sensors;
   sampling an output for each optical sensor of a plurality of optical sensors of the image sensor, wherein each optical sensor is associated with one or more optical filters, wherein each optical filter is associated with a group of optical filters of a plurality of groups of optical filters, wherein each optical filter of a group of optical filters is configured to pass light in a different wavelength range and wherein at least some optical filters in different groups of the plurality of groups of optical filters are configured to pass light in substantially a same wavelength range;
   comparing a sampled output for each optical sensor of the plurality of optical sensors with an expected output;
   based on the comparing, generating a calibration factor for each of at least a subset of the plurality of optical sensors; and
   storing the calibration factor for each of the at least a subset of the plurality of optical sensors in memory.

2. The method of claim 1, wherein the optical filters of each group of optical filters are further configured to provide a spectrum of wavelengths.

3. The method of claim 1, wherein each group of optical filters of the plurality of optical filters is associated with a spatial area of the image sensor.

4. The method of claim 1, wherein each optical filter of a group of optical filters is adjacent to another optical filter of the group of optical filters.

5. The method of claim 1, wherein at least a portion of the optical filters are interference filters.

6. The method of claim 1, wherein the comparing a sampled output for each optical sensor of the plurality of optical sensors with an expected output comprises:
comparing the sampled output of at least some optical sensors associated with optical filters within one or more groups of optical filters with other optical sensors associated with optical filters within a same one or more groups of optical filters.

7. The method of claim 6, further comprising:
comparing the output of the at least some optical associated with optical filters configured to pass light in substantially the same wavelength range in different groups of the plurality of groups of optical filters;
based on the comparing, determine an additional one or more calibration factors for one or more optical sensors of the plurality of optical sensors; and
store the additional one or more calibration factors in memory.

8. The method of claim 1, wherein the image sensor is fabricated on an integrated circuit, wherein the expected output corresponds to data stored in another memory, wherein the another memory is located on the integrated circuit.

9. The method of claim 1, wherein the image sensor is fabricated on an integrated circuit, wherein the memory is located on a same integrated circuit with the image sensor.

10. A spectral imaging system comprises:
an array of optical sensors arranged on an integrated circuit, the array of optical sensors having a respective top surface;
a plurality of optical filters having a respective top surface and a respective bottom surface, wherein the bottom surface of the plurality of optical filters is located proximal to the top surface of the array of optical sensors, wherein each optical sensor is associated with one or more optical filters, wherein each optical filter is associated with a group of optical filters of a plurality of groups of optical filters, wherein each optical filter of a group of optical filters is configured to pass light in a different wavelength range and wherein at least some optical filters in different groups of the plurality of groups of optical filters are configured to pass light in substantially a same wavelength range;
an interface;
a local memory; and
a processing module operably coupled to the interface and the local memory, wherein the processing module functions to:
sample an output from each optical sensor of the array of optical sensors, wherein the output is based on the array of optical sensors being illuminated with a light spectrum that includes light of known wavelength and intensity;
compare the sampled output for each optical sensor of the array of optical sensors with an expected output;
based on the comparing, generate a calibration factor for each of at least a subset of the array of optical sensors; and
store the calibration factor for each of the at least a subset of the array of optical sensors in memory.

11. The spectral imaging system of claim 10, wherein the optical filters of each group of optical filters are further configured to provide a spectrum of wavelengths.

12. The spectral imaging system of claim 10, wherein each group of optical filters of the plurality of optical filters is associated with a spatial area of the array of optical sensors.

13. The spectral imaging system of claim 10, wherein each optical filter of a group of optical filters is adjacent to another optical filter of the group of optical filters.

14. The spectral imaging system of claim 10, wherein at least a portion of the optical filters are interference filters.

15. The spectral imaging system of claim 10, wherein the processing module further functions to:
compare the sampled output of at least some optical sensors associated with optical filters within one or more groups of optical filters with other optical sensors associated with optical filters within a same one or more groups of optical filters.

16. The spectral imaging system of claim 15, wherein the processing module further functions to:
compare the output of the at least some optical associated with optical filters configured to pass light in substantially the same wavelength range in different groups of the plurality of groups of optical filters;
based on the comparison, determine an additional one or more calibration factors for one or more optical sensors of the plurality of optical sensors; and
store the additional one or more calibration factors in memory.

17. The spectral imaging system of claim 15, wherein the expected output corresponds to data stored in another memory, wherein the another memory is fabricated on the integrated circuit.

18. The spectral imaging system of claim 15, wherein the memory is fabricated on the integrated circuit with the image sensor.

19. A method comprises:
sampling an output for each optical sensor of a plurality of optical sensors of an image sensor, wherein each optical sensor is associated with one or more optical filters, wherein each optical filter is associated with a group of optical filters of a plurality of groups of optical filters, wherein each optical filter of a group of optical filters is configured to pass light in a different wavelength range and wherein at least some optical filters in different groups of the plurality of groups of optical filters are configured to pass light in substantially a same wavelength range; and
correcting the sampled output for each optical sensor of the plurality of optical sensors using a predetermined calibration factor stored in memory, wherein the predetermined calibration factor is based on a comparison between a calibration sample output and a sample output for light of known wavelength and intensity.

20. The method of claim 19, wherein the image sensor is fabricated on an integrated circuit, wherein the memory is located on a same integrated circuit with the image sensor.

* * * * *